United States Patent
Iitani et al.

(10) Patent No.: US 12,410,581 B2
(45) Date of Patent: Sep. 9, 2025

(54) ELECTRIC CYLINDER AND WORK MACHINE

(71) Applicant: Komatsu Ltd., Tokyo (JP)

(72) Inventors: Hideshi Iitani, Tokyo (JP); Shouta Akazaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/730,372

(22) PCT Filed: Nov. 17, 2022

(86) PCT No.: PCT/JP2022/042709
§ 371 (c)(1),
(2) Date: Jul. 19, 2024

(87) PCT Pub. No.: WO2023/139906
PCT Pub. Date: Jul. 27, 2023

(65) Prior Publication Data
US 2025/0101707 A1   Mar. 27, 2025

(30) Foreign Application Priority Data
Jan. 20, 2022   (JP) .................. 2022-007049

(51) Int. Cl.
*E02F 3/42*   (2006.01)
*E02F 3/32*   (2006.01)
(Continued)

(52) U.S. Cl.
CPC ............... *E02F 3/425* (2013.01); *E02F 3/32* (2013.01); *F16H 25/24* (2013.01); *F16H 2025/2081* (2013.01)

(58) Field of Classification Search
CPC ............ F16H 57/0482; F16H 57/0401; F16H 57/0412; E02F 3/425; E02F 3/32
See application file for complete search history.

(56) References Cited

U.S. PATENT DOCUMENTS

| 7,121,974 B2 * | 10/2006 | Bayer | F16H 1/28 |
| | | | 475/331 |
| 7,216,723 B2 * | 5/2007 | Ohtsu | B25B 21/026 |
| | | | 310/23 |

(Continued)

FOREIGN PATENT DOCUMENTS

| JP | H06-059626 U | 8/1994 |
| JP | H07-110047 A | 4/1995 |

(Continued)

*Primary Examiner* — Huan Le
(74) *Attorney, Agent, or Firm* — Troutman Pepper Locke LLP

(57) ABSTRACT

An electric cylinder includes a motor that is a driving source, an output shaft configured to rotate in response to driving of the motor, a sun gear coupled to the output shaft and configured to rotate in response to the rotation of the output shaft, a tubular holder disposed adjacent to an axial end surface of the motor and including a fluid accommodation portion that allows a magnetic fluid to be accommodated between the holder and an outer periphery of the sun gear, a pair of magnetic pole pieces provided on an inner peripheral surface of the holder, and a magnet disposed between the pair of magnetic pole pieces and configured to hold the magnetic fluid in the fluid accommodation portion by using an action of a magnetic field.

20 Claims, 18 Drawing Sheets

(51) Int. Cl.
  *F16H 25/20*   (2006.01)
  *F16H 25/24*   (2006.01)

(56) References Cited

U.S. PATENT DOCUMENTS

| | | |
|---|---|---|
| 10,689,097 B2 * | 6/2020 | Nfonguem ............ F16H 25/205 |
| 2014/0299434 A1 * | 10/2014 | Lull ........................ F16D 37/02 |
| | | 192/21.5 |
| 2021/0381193 A1 | 12/2021 | Ishikawa et al. |

FOREIGN PATENT DOCUMENTS

| | | |
|---|---|---|
| JP | 2012-184816 A | 9/2012 |
| JP | 2020-204172 A | 12/2020 |

\* cited by examiner

ELECTRIC CYLINDER AND WORK MACHINE

TECHNICAL FIELD

The present invention relates to an electric cylinder and a work machine.

Priority is claimed on Japanese Patent Application No. 2022-007049, filed Jan. 20, 2022, the content of which is incorporated herein by reference.

BACKGROUND ART

Patent Document 1 discloses an electric excavator as an example of a work machine. The electric excavator includes a vehicle body, a boom that is provided to be rotationally movable with respect to the vehicle body, and an electric cylinder. The boom is driven by the electric cylinder.

On the other hand, the electric cylinder may include a planetary gear mechanism that transmits the driving force of a motor, which is a driving source, to a piston. The planetary gear mechanism includes a sun gear coupled to an output shaft of the motor, and a plurality of planetary gears adjacent to the sun gear. The sun gear rotates in response to the rotation of the output shaft. The plurality of planetary gears rotate in response to the rotation of the sun gear. A tooth surface of the sun gear is in contact with a tooth surface of the planetary gear.

CITATION LIST

Patent Document

[Patent Document 1]
Japanese Unexamined Patent Application, First Publication No. 2020-204172

SUMMARY OF INVENTION

Technical Problem

In a case of Patent Document 1, the boom rotationally moves in response to driving of the electric cylinder. In Patent Document 1, in order to prevent a problem caused by heat generation of the motor which is the driving source of the electric cylinder, it is required to efficiently release heat from the motor to the outside. For example, in a case in which the motor serving as power is downsized, a proportion of the motor used in an acceleration region is increased, and thus heat release from a motor surface alone is not sufficient, and the temperature is likely to increase. In a case in which the motor generates excessive heat, the performance of the motor may deteriorate or the motor may malfunction. Therefore, it is necessary to efficiently transfer the heat of the motor and release the heat to the outside.

On the other hand, in a case in which the electric cylinder includes the planetary gear mechanism, a peripheral portion of the sun gear is heated to a high temperature due to the heat transferred from the output shaft of the motor and the heat generated on the tooth surface of the sun gear. In this case, a lubricant, such as grease, may melt out due to the high temperature, and the failure of the lubrication is likely to occur. In a case in which the failure of the lubrication occurs, the gear surface is locally deteriorated or worn due to frictional heat, which causes a problem such as a sliding portion of the sun gear to be stuck. Therefore, in order to prevent the problem caused by the temperature rise of the peripheral portion of the sun gear, it is required to efficiently release the heat of the sun gear tooth surface to the outside along with the heat from the motor.

An object of the present invention is to provide an electric cylinder and a work machine that can efficiently release heat from a motor and heat from a tooth surface of a sun gear to the outside.

Solution to Problem

An electric cylinder according to an aspect of the present invention includes: a motor that is a driving source; an output shaft configured to rotate in response to driving of the motor; a sun gear coupled to the output shaft and configured to rotate in response to the rotation of the output shaft; a tubular holder disposed adjacent to an axial end surface of the motor and including a fluid accommodation portion that allows a magnetic fluid to be accommodated between the holder and an outer periphery of the sun gear; a pair of magnetic pole pieces provided on an inner peripheral surface of the holder; and a magnet disposed between the pair of magnetic pole pieces and configured to hold the magnetic fluid in the fluid accommodation portion by using an action of a magnetic field.

Advantageous Effects of Invention

According to the above-described aspect, the heat from the motor and the heat from the tooth surface of the sun gear can be efficiently released to the outside.

DESCRIPTION OF EMBODIMENTS

Hereinafter, an embodiment of the present invention will be described with reference to the drawings. In the embodiment, an excavator will be described as an exemplary example of a work machine (work vehicle).

<Excavator (Work Machine)>

Figure 1:
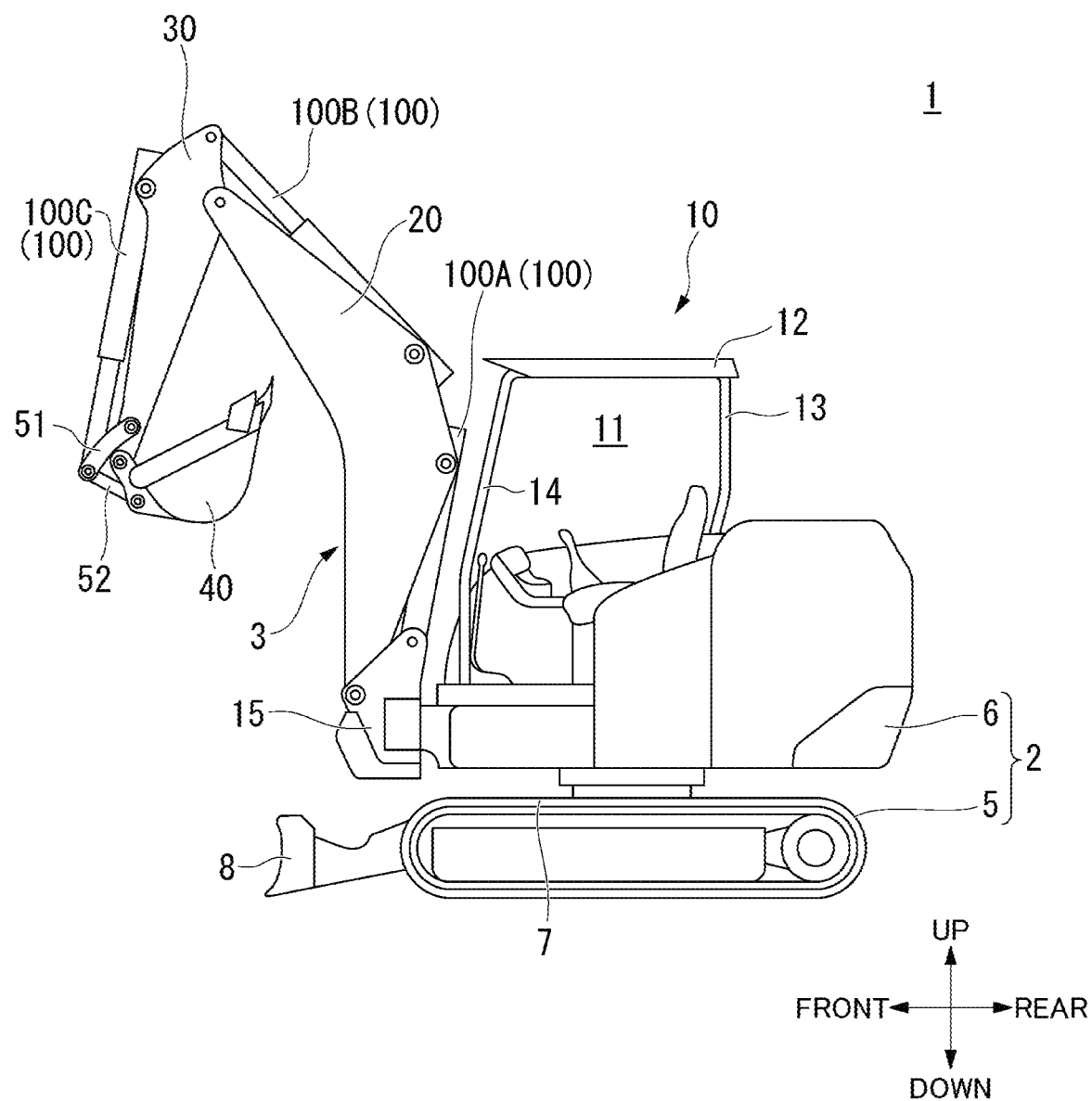
FIG. 1 is a side view of an excavator according to an embodiment.

As shown in FIG. 1, an excavator 1 as the work machine includes a vehicle body 2 and work equipment 3 coupled to the vehicle body 2. Hereinafter, an advance direction, a retraction direction, and a vehicle width direction of the excavator 1 will be referred to as a "front side of a vehicle (one side in a front-rear direction of the vehicle)", a "rear side of a vehicle (the other side in the front-rear direction of the vehicle)", and a "vehicle width direction". The vehicle width direction may be referred to as a "left side (one side in the vehicle width direction)" or a "right side (the other side in the vehicle width direction)". A right hand with respect to the advance direction of the excavator 1 will be referred to as a right side, and a left hand with respect to the advance direction of the excavator 1 will be referred to as a left side. An up-down direction, an upper side, and a lower side of the excavator 1 in a state in which the excavator 1 is disposed in a horizontal plane will be simply referred to as an "up-down direction", an "upper side", and a "lower side".

<Vehicle Body>

The vehicle body 2 includes an autonomous undercarriage 5 and an upper swing body 6 that is provided on the undercarriage 5 to be able to swing.

The undercarriage 5 includes a pair of left and right crawler belts 7. The undercarriage 5 includes an electric motor (not shown) that drives the crawler belts 7. The undercarriage 5 travels by driving the crawler belts 7 via the electric motor. It should be noted that the undercarriage 5 may be provided with a hydraulic motor instead of the electric motor.

A blade 8 as a dirt discharging plate extending in the vehicle width direction of the undercarriage 5 is provided at a front portion of the undercarriage 5. The undercarriage 5 includes an electric actuator (not shown) that drives the blade 8. The height position of the blade 8 can be adjusted by driving the electric actuator.

The upper swing body 6 is provided above the undercarriage 5. The upper swing body 6 is provided with a traveling electric motor that is a driving source of the undercarriage 5, a motor of an electric cylinder that is a driving source of the work equipment 3, a battery serving as a power source of each motor, an inverter, and the like (not shown). The upper swing body 6 is configured to swing about an axis extending in the up-down direction with respect to the undercarriage 5.

A canopy 10 is provided on the upper swing body 6. The canopy 10 has a driving space 11 in which a driver can be accommodated. The canopy 10 includes a hood 12 that forms a ceiling portion of the driving space 11, rear portion pillars 13 that are provided on both sides of the hood 12 in the vehicle width direction at a rear portion of the hood 12 and that extend downward from the hood 12, and front portion pillars 14 that are provided on both sides of the hood 12 in the vehicle width direction at a front portion of the hood 12 and that extend downward from the hood 12.

Figure 2:
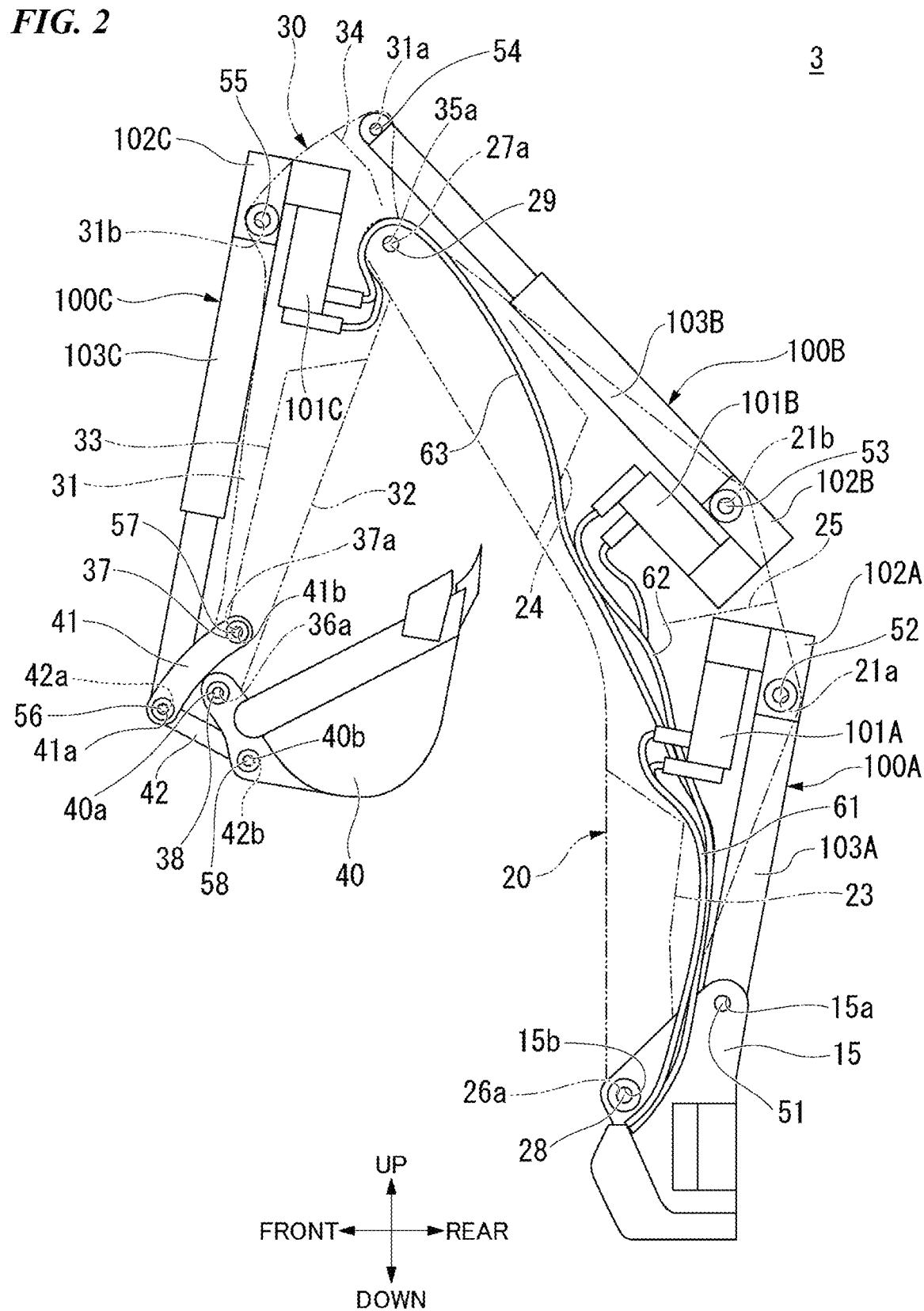
FIG. 2 is a side view of work equipment according to the embodiment, which shows an inside of a boom and an arm in a transparent manner.

A bracket 15 that supports a boom 20 is provided on a front portion of the upper swing body 6. As shown in FIG. 2, the bracket 15 includes a first hole 15a and a second hole 15b that are open in the vehicle width direction of the upper swing body 6. The first hole 15a is disposed in the vicinity of an upper end portion of the bracket 15. The second hole 15b is disposed below and in front of the first hole 15a.

<Work Equipment>

As shown in FIG. 1, the work equipment 3 is provided to be operable in a bending and undulating manner with respect to the upper swing body 6. The work equipment 3 includes the boom 20, an arm 30, a bucket 40 (work tool), and a plurality (for example, three in the present embodiment) of electric cylinders 100A to 100C. The three electric cylinders 100A to 100C are a first electric cylinder 100A that operates the boom 20, a second electric cylinder 100B that operates the arm 30, and a third electric cylinder 100C that operates the bucket 40. A base end portion of the boom 20 is rotatably coupled to the upper swing body 6. A distal end portion of the boom 20 is rotatably coupled to a base end portion of the arm 30. A distal end portion of the arm 30 is rotatably coupled to the bucket 40.

<Boom>

In a posture of FIG. 1, the boom 20 extends upward from the bracket 15 and then is bent and extends forward and upward when viewed from the vehicle width direction of the upper swing body 6. Hereinafter, when viewed from the vehicle width direction of the upper swing body 6, a direction in which the boom 20 extends will be referred to as a "boom extension direction", and a direction orthogonal to the boom extension direction will be referred to as a "boom plate width direction". One end portion (end portion on the bracket 15 side) of the boom 20 in the boom extension direction will be referred to as a "boom base end portion". Another end portion (end portion on a side opposite to the boom base end portion) of the boom 20 in the boom extension direction will be referred to as a "boom distal end portion". The dimension in the boom plate width direction gradually increases from the boom base end portion toward the vicinity of the center in the boom extension direction, and then gradually decreases toward the boom distal end portion.

Figure 3:
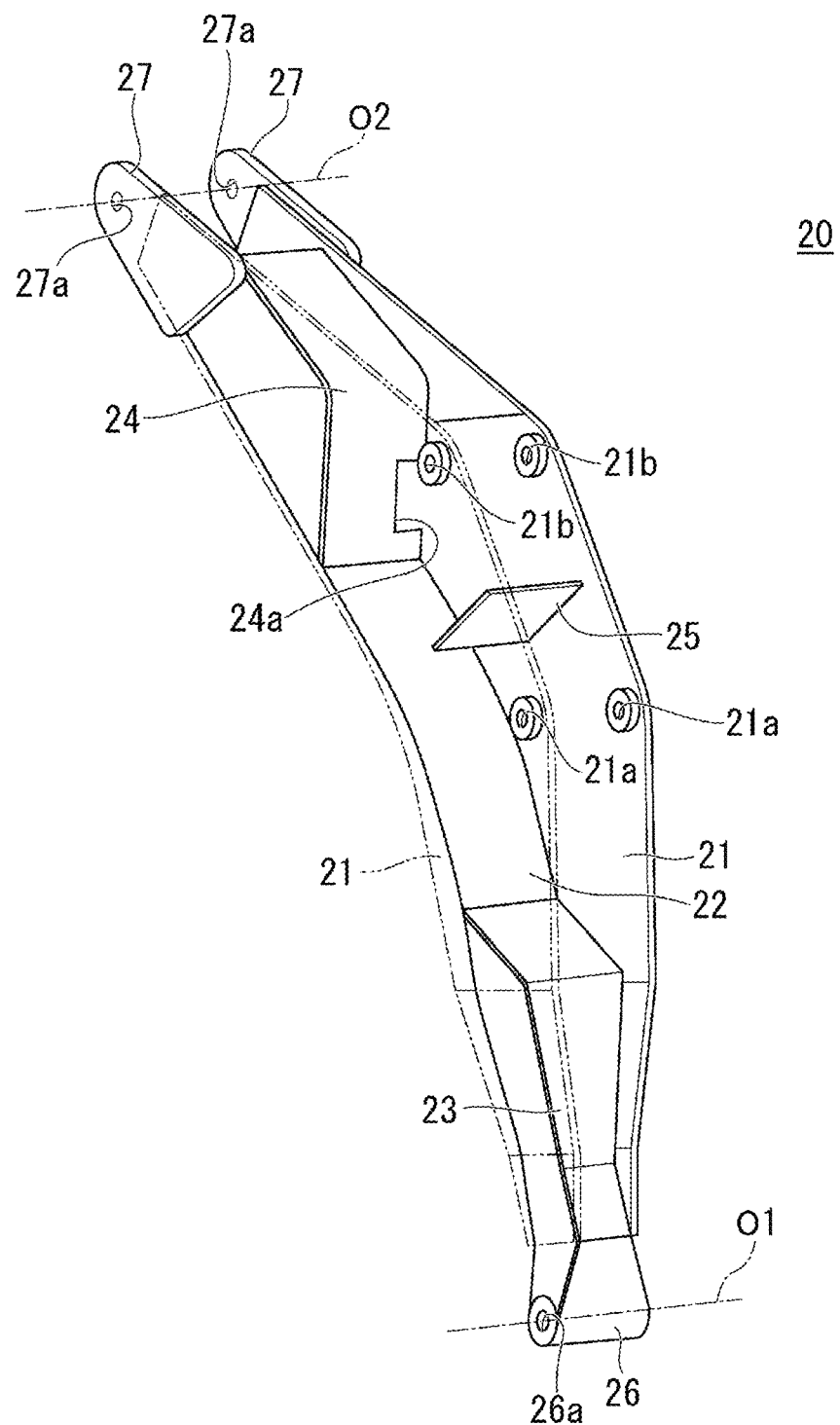
FIG. 3 is a perspective view of the boom according to the embodiment, which shows the inside of the boom in a transparent manner.

As shown in FIG. 3, the boom 20 includes a pair of boom side plates 21 that are disposed to be spaced apart from each other in the vehicle width direction of the upper swing body 6, a boom bottom plate 22 that extends in the vehicle width direction of the upper swing body 6 to connect the pair of boom side plates 21 to each other, a boom base end side connection plate 23 connected to the boom base end portion side of the boom bottom plate 22, a boom distal end side connection plate 24 connected to the boom distal end portion side of the boom bottom plate 22, a boom partition member 25 that partitions a space interposed by the pair of boom side plates 21 in the vicinity of the center in the boom extension direction, a boom base end support member 26 that supports the boom base end portion on the upper swing body 6, and an arm support plate 27 that supports the arm 30.

The boom side plate 21 includes a first cylinder base end side hole 21a and a second cylinder base end side hole 21b that are open in the vehicle width direction of the upper swing body 6. As shown in FIG. 2, the first cylinder base end side hole 21a is disposed below the vicinity of the center in the boom extension direction and in a portion overlapping with a part of the first electric cylinder 100A (in the vicinity of an upper end portion in FIG. 2) when viewed from the vehicle width direction of the upper swing body 6. The second cylinder base end side hole 21b is disposed above the vicinity of the center in the boom extension direction and in a portion overlapping with a part of the second electric cylinder 100B (in the vicinity of a lower end portion in FIG. 2) when viewed from the vehicle width direction of the upper swing body 6.

As shown in FIG. 3, the boom bottom plate 22 is provided at an edge portion on a side opposite to the upper swing body 6 in the boom plate width direction of the boom side plate 21. The boom bottom plate 22 extends along the boom extension direction. The boom bottom plate 22 is curved between the first cylinder base end side hole 21a and the second cylinder base end side hole 21b in the vicinity of the center in the boom extension direction.

The boom base end side connection plate 23 extends on the boom base end portion side in the vehicle width direction of the upper swing body 6, to connect the pair of boom side plates 21 to each other. The boom base end side connection plate 23 extends to approach the boom base end portion as the distance from a connection portion with the boom bottom plate 22 increases in the boom plate width direction, and then is bent to extend toward the boom base end portion.

The boom distal end side connection plate 24 extends on the boom distal end portion side in the vehicle width direction of the upper swing body 6, to connect the pair of boom side plates 21 to each other. The boom distal end side connection plate 24 extends to approach the boom distal end portion as the distance from a connection portion with the boom bottom plate 22 increases in the boom plate width direction, and then is bent to extend toward the boom distal end portion. The boom distal end side connection plate 24 includes an opening portion 24a that is open in the boom extension direction at a position adjacent to one boom side plate 21.

The boom partition member 25 extends in the vehicle width direction of the upper swing body 6 in the vicinity of the center in the boom extension direction, to connect the pair of boom side plates 21 to each other. The boom partition member 25 extends along the boom plate width direction. The boom partition member 25 is disposed between the first cylinder base end side hole 21a and the second cylinder base end side hole 21b. The boom partition member 25 is spaced apart from the boom bottom plate 22 in the boom plate width direction.

The boom base end support member 26 is provided on the boom base end portion side. The boom base end support member 26 includes a first through-hole 26a that is open in the vehicle width direction of the upper swing body 6. A first pin 28 (see FIG. 2) extending in the vehicle width direction of the upper swing body 6 is inserted into the first through-hole 26a. The first pin 28 is inserted into the first through-hole 26a of the boom base end support member 26 and the second hole 15b of the bracket 15, whereby the boom 20 is supported to be rotationally movable about a central axis O1 of the first pin 28.

The arm support plate 27 is provided on the boom distal end portion side. The arm support portions 16 are provided on an outer surface of the boom side plate 21 to interpose the pair of boom side plates 21 from the outer side of the upper swing body 6 in the vehicle width direction. The arm support plate 27 protrudes outward in the boom extension direction with respect to the boom side plate 21. The arm support plate 27 includes a second through-hole 27a that is open in the vehicle width direction of the upper swing body 6. The second through-hole 27a is provided in a portion of the arm support plate 27 that protrudes outward in the boom extension direction with respect to the boom side plate 21. A second pin 29 (see FIG. 2) that extends in the vehicle width direction of the upper swing body 6 is inserted into the second through-hole 27a.

<Arm>

In the posture of FIG. 1, the arm 30 extends downward and forward from a portion overlapping with a part of the second electric cylinder 100B (in the vicinity of the upper end portion in FIG. 1) when viewed from the vehicle width direction of the upper swing body 6. Hereinafter, when viewed from the vehicle width direction of the upper swing body 6, a direction in which the arm 30 extends will be referred to as an "arm extension direction", and a direction orthogonal to the arm extension direction will be referred to as an "arm plate width direction". One end portion (end portion on the second electric cylinder 100B side) of the arm 30 in the arm extension direction will be referred to as an "arm base end portion". Another end portion (end portion on a side opposite to the arm base end portion) of the arm 30 in the arm extension direction will be referred to as an "arm distal end portion". The dimension in the arm plate width direction gradually increases from the arm base end portion toward the vicinity of the boom connection portion in the arm extension direction, and then gradually decreases toward the arm distal end portion.

Figure 4:
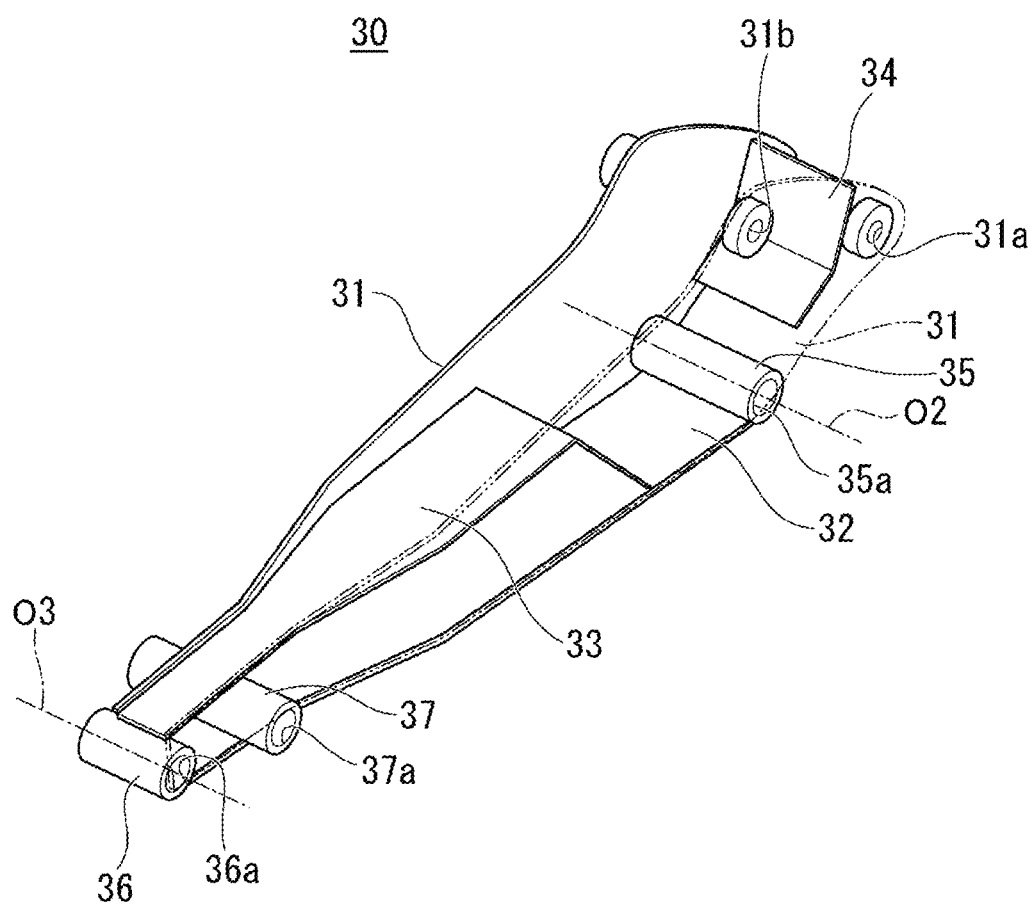
FIG. 4 is a perspective view of the arm according to the embodiment, which shows the inside of the arm in a transparent manner.

As shown in FIG. 4, the arm 30 includes a pair of arm side plates 31 that are disposed to be spaced apart from each other in the vehicle width direction of the upper swing body 6, an arm bottom plate 32 that extends in the vehicle width direction of the upper swing body 6 to connect the pair of arm side plates 31 to each other, an arm side connection plate 33 connected to the arm bottom plate 32, an arm partition member 34 that partitions a space between the pair of arm side plates 31 in the vicinity of the arm base end portion, a boom distal end connection member 35 connected to the boom distal end portion, a bucket support member 36 that supports the bucket 40 (see FIG. 2), and a link support member 37 that supports one end portion of a first link member 41 (see FIG. 2).

The arm side plate 31 includes a second cylinder distal end side hole 31a and a third cylinder base end side hole 31b that are open in the vehicle width direction of the upper swing body 6. As shown in FIG. 2, the second cylinder distal end side hole 31a is disposed in the vicinity of the arm base end portion and in a portion overlapping with a part of the second electric cylinder 100B (in the vicinity of the upper end portion in FIG. 2) when viewed from the vehicle width direction of the upper swing body 6. The third cylinder base end side hole 31b is disposed on a side opposite to the portion overlapping with the boom distal end portion in the arm plate width direction and in a portion overlapping with a part of the third electric cylinder 100C (in the vicinity of the upper end portion in FIG. 2) when viewed from the vehicle width direction of the upper swing body 6.

In a posture of FIG. 2, the arm bottom plate 32 is provided at an edge portion on the upper swing body 6 side (the boom 20 side) in the arm side plate 31 in the arm plate width direction. The arm bottom plate 32 extends along the arm extension direction. As shown in FIG. 4, the arm bottom plate 32 extends between the boom distal end connection member 35 and the bucket support member 36 in the arm extension direction.

The arm side connection plate 33 extends on the arm distal end portion side in the vehicle width direction of the upper swing body 6, to connect the pair of arm side plates 31 to each other. The arm side connection plate 33 extends to approach the arm distal end portion as the distance from a connection portion with the arm bottom plate 32 increases in the arm plate width direction, and then is bent to extend toward the arm distal end portion.

The arm partition member 34 extends in the vicinity of the arm base end portion in the vehicle width direction of the upper swing body 6, to connect the pair of arm side plates 31 to each other. The arm partition member 34 is disposed between the second cylinder distal end side hole 31a and the third cylinder base end side hole 31b. The arm partition member 34 is disposed to be spaced apart from the boom distal end connection member 35. When viewed from the vehicle width direction of the upper swing body 6, the arm partition member 34 extends from the vicinity of the boom distal end connection member 35 toward the arm distal end portion side, and then is bent to extend to cross between the second cylinder distal end side hole 31a and the third cylinder base end side hole 31b.

The boom distal end connection member 35 is formed in a tubular shape extending in the vehicle width direction of the upper swing body 6. The boom distal end connection member 35 includes a boom connection hole 35a that is open in the vehicle width direction of the upper swing body 6. As shown in FIG. 2, the boom connection hole 35a overlaps with the second through-hole 27a of the arm support plate 27 when viewed from the vehicle width direction of the upper swing body 6. The second pin 29 is inserted into the second through-hole 27a of the arm support plate 27 and the boom connection hole 35a of the boom distal end connection member 35, whereby the arm 30 is supported to be rotationally movable about a central axis O2 (see FIG. 4) of the second pin 29.

As shown in FIG. 4, the bucket support member 36 is provided at the arm distal end portion. The bucket support member 36 is formed in a tubular shape extending in the vehicle width direction of the upper swing body 6. The bucket support member 36 includes a third through-hole 36a that is open in the vehicle width direction of the upper swing body 6. A third pin 38 (see FIG. 2) extending in the vehicle width direction of the upper swing body 6 is inserted into the third through-hole 36a.

As shown in FIG. 4, the link support member 37 is disposed between the arm bottom plate 32 and the arm side connection plate 33. The link support member 37 is disposed in the vicinity of the bucket support member 36. The link support member 37 is formed in a tubular shape extending in the vehicle width direction of the upper swing body 6. The link support member 37 protrudes outward in the vehicle width direction of the upper swing body 6 with respect to the pair of arm side plates 31. The link support member 37 includes a first link connection hole 37a that is open in the vehicle width direction of the upper swing body 6.

<Bucket>

In the posture of FIG. 2, the bucket 40 is inclined from the arm distal end portion toward the vicinity of the center in the boom extension direction. The bucket 40 includes a bucket connection hole 40a and a second link connection hole 40b that are open in the vehicle width direction of the upper swing body 6.

The bucket connection hole 40a overlaps with the third through-hole 36a of the bucket support member 36 when viewed from the vehicle width direction of the upper swing body 6. The third pin 38 is inserted into the third through-hole 36a of the bucket support member 36 and the bucket connection hole 40a of the bucket 40, whereby the bucket 40 is supported to be rotationally movable about a central axis O3 (see FIG. 4) of the third pin 38.

In the posture of FIG. 2, the second link connection hole 40b is disposed at a position lower and rearward of the bucket connection hole 40a.

<First Electric Cylinder>

As shown in FIG. 2, the first electric cylinder 100A is disposed on the boom base end portion side with respect to the boom partition member 25. The first electric cylinder 100A includes a first cylinder body 103A configured to expand and contract along the boom extension direction, a first motor 101A that is a driving source, and a first power transmission unit 102A that transmits the driving force of the first motor 101A to the first cylinder body 103A.

The first cylinder body 103A and the first motor 101A extend parallel to each other. A first end portion of the first cylinder body 103A is connected to a pin 51 inserted into the first hole 15a of the bracket 15. The first electric cylinder 100A is supported by the upper swing body 6 via the bracket 15 to be rotationally movable about a central axis of the pin 51 extending in the width direction of the upper swing body 6.

A second end portion of the first cylinder body 103A is connected to a pin 52 inserted into the first cylinder base end side hole 21a of the boom 20. The first electric cylinder 100A is supported by the boom 20 to be rotationally movable about a central axis of the pin 52 extending in the width direction of the upper swing body 6.

The first motor 101A is disposed on the second end portion side of the first cylinder body 103A. The first motor 101A is disposed on an inner side in the boom plate width direction with respect to the first cylinder body 103A. The first motor 101A operates the first cylinder body 103A using a battery (not shown) provided in the upper swing body 6 as a power source. The first cylinder body 103A expands and contracts in response to the driving of the first motor 101A, whereby the boom 20 rotationally moves about the central axis O1 (see FIG. 3) of the first pin 28 with respect to the upper swing body 6.

A first wiring 61 extends from the first motor 101A. The first wiring 61 extends along the boom base end side connection plate 23 and is led into the bracket 15. The first wiring 61 is connected to a battery (not shown) through the bracket 15.

<Second Electric Cylinder>

The second electric cylinder 100B is disposed on the boom distal end portion side with respect to the boom partition member 25. The second electric cylinder 100B includes a second cylinder body 103B configured to expand and contract along the boom extension direction, a second motor 101B that is a driving source, and a second power transmission unit 102B that transmits the driving force of the second motor 101B to the second cylinder body 103B.

The second cylinder body 103B and the second motor 101B extend parallel to each other. A first end portion of the second cylinder body 103B is connected to a pin 53 inserted into the second cylinder base end side hole 21b of the boom 20. The second electric cylinder 100B is supported by the boom 20 to be rotationally movable about a central axis of the pin 53 extending in the width direction of the upper swing body 6 with respect to the boom 20.

A second end portion of the second cylinder body 103B is connected to a pin 54 inserted into the second cylinder distal end side hole 31a of the arm 30. The second electric cylinder 100B is supported by the arm 30 to be rotationally movable about a central axis of the pin 54 extending in the width direction of the upper swing body 6 with respect to the arm 30.

The second motor 101B is disposed on the first end portion side of the second cylinder body 103B. The second motor 101B is disposed on an inner side in the boom plate width direction with respect to the second cylinder body 103B. The second motor 101B operates the second cylinder body 103B using a battery (not shown) provided in the upper swing body 6 as a power source. The second cylinder body 103B expands and contracts in response to the driving of the second motor 101B, whereby the arm 30 rotationally moves about the central axis O2 (see FIG. 3) of the second pin 29 with respect to the boom 20.

A second wiring 62 extends from the second motor 101B. The second wiring 62 extends toward the first motor 101A and then extends along the boom base end side connection plate 23 together with the first wiring 61, and is led into the bracket 15. The second wiring 62 is connected to a battery (not shown) through the bracket 15.

<Third Electric Cylinder>

The third electric cylinder 100C is disposed on the arm distal end portion side with respect to the arm partition member 34. The third electric cylinder 100C includes a third cylinder body 103C configured to expand and contract along the arm extension direction, a third motor 101C that is a driving source, and a third power transmission unit 102C that transmits the driving force of the third motor 101C to the third cylinder body 103C.

The third cylinder body 103C and the third motor 101C extend parallel to each other. A first end portion of the third cylinder body 103C is connected to a pin 55 inserted into the third cylinder base end side hole 31b of the arm 30. The third electric cylinder 100C is supported by the arm 30 to be rotationally movable about a central axis of the pin 55 extending in the width direction of the upper swing body 6 with respect to the arm 30.

A second end portion of the third cylinder body 103C is connected to a first end portion of the first link member 41. The first end portion of the first link member 41 includes a first link hole 41a that is open in the width direction of the upper swing body 6. The second end portion of the third cylinder body 103C is connected to a pin 56 inserted into the first link hole 41a. The third electric cylinder 100C supports the first link member 41 to be rotationally movable about a central axis of the pin 56 extending in the width direction of the upper swing body 6 with respect to the first link member 41.

The second end portion of the first link member 41 includes a second link hole 41b that is open in the width direction of the upper swing body 6. A pin 57 is inserted into the second link hole 41b together with the first link connection hole 37a of the arm 30. The first link member 41 is supported by the arm 30 to be rotationally movable about a central axis of the pin 57 extending in the width direction of the upper swing body 6 with respect to the arm 30.

The second end portion of the third cylinder body 103C is connected to a first end portion of a second link member 42. The first end portion of the second link member 42 includes a third link hole 42a that is open in the width direction of the upper swing body 6. The second end portion of the third cylinder body 103C is connected to the pin 56 inserted into the third link hole 42a together with the first link hole 41a. The second link member 42 is provided to be rotationally movable about the central axis of the pin 56 extending in the width direction of the upper swing body 6 with respect to the second end portion of the third cylinder body 103C and the first end portion of the first link member 41.

A second end portion of the second link member 42 includes a fourth link hole 42b that penetrates in the width direction of the upper swing body 6. A pin 58 is inserted into the fourth link hole 42b together with the second link connection hole 40b of the bucket 40. The second link member 42 is provided to be rotationally movable about a central axis of the pin 58 extending in the width direction of the upper swing body 6 with respect to the bucket 40.

The third motor 101C is disposed on the first end portion side of the third cylinder body 103C. The third motor 101C is disposed on an inner side in the arm plate width direction with respect to the third cylinder body 103C. The third motor 101C operates the third cylinder body 103C using a battery (not shown) provided in the upper swing body 6 as a power source. The third cylinder body 103C expands and contracts in response to the driving of the third motor 101C, whereby the bucket 40 rotationally moves about the central axis O3 (see FIG. 4) of the third pin 38 with respect to the arm 30.

A third wiring 63 extends from the third motor 101C. The third wiring 63 extends toward the boom 20 and then passes through the opening portion 24a (see FIG. 3) of the boom distal end side connection plate 24. Thereafter, the third wiring 63 extends toward the first motor 101A and then extends along the boom base end side connection plate 23 together with the first wiring 61 and the second wiring 62, and is led into the bracket 15. The third wiring 63 is connected to a battery (not shown) through the bracket 15.

<Electric Cylinder>

Figure 5:
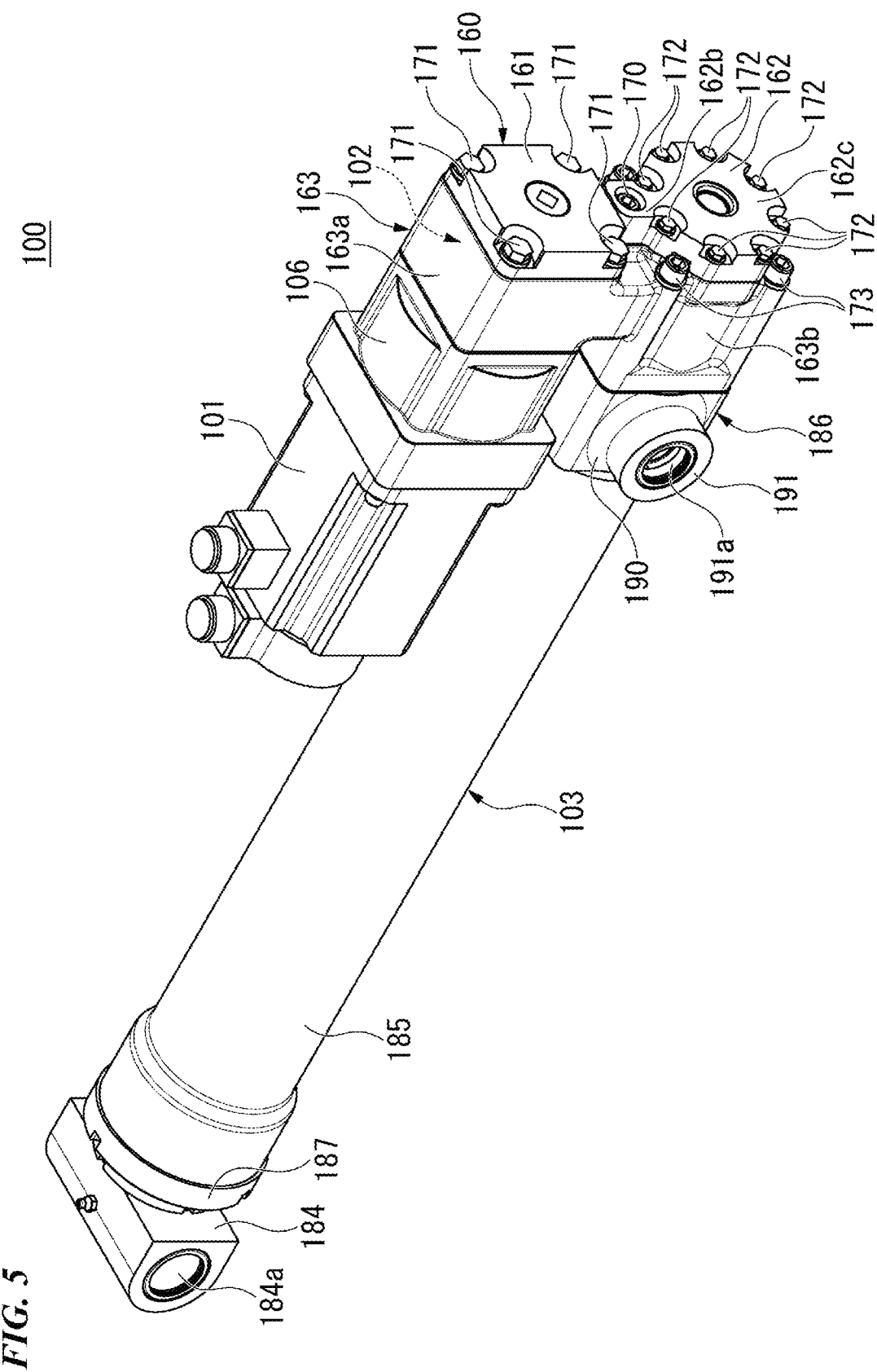
FIG. 5 is a perspective view of an electric cylinder according to the embodiment.

As shown in FIG. 1, the first electric cylinder 100A, the second electric cylinder 100B, and the third electric cylinder 100C are the electric cylinder 100 common to each other. As shown in FIG. 5, the electric cylinder 100 includes a motor 101, a power transmission unit 102, and a cylinder body 103.

Figure 8:
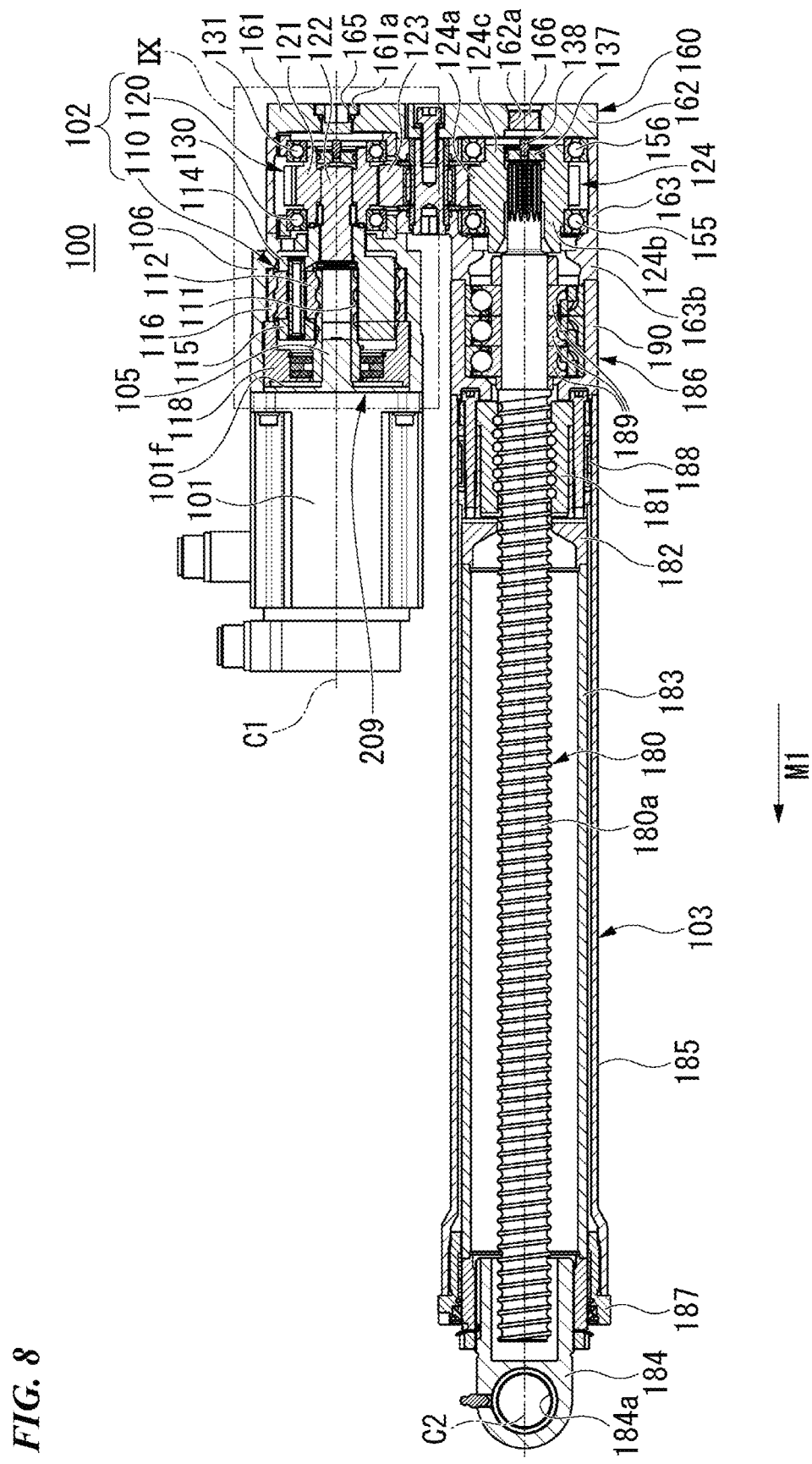
FIG. 8 is a view including a cross section of VIII-VIII of FIG. 7.

The motor 101 is a driving source of the electric cylinder 100. For example, the motor 101 is a servo motor. As shown in FIG. 8, the motor 101 and the cylinder body 103 extend parallel to each other. The motor 101 and the cylinder body 103 are arranged apart from each other.

The electric cylinder 100 includes an output shaft 105 that rotates in response to the driving of the motor 101. The output shaft 105 is provided coaxially with a central axis of the motor 101. The output shaft 105 protrudes outward in the axial direction from an axial end surface 101f of the motor 101. Reference numeral C1 in the drawing indicates a motor axis along the central axis of the motor 101.

The power transmission unit 102 transmits the driving force of the motor 101 to a piston 182. The power transmission unit 102 includes a planetary gear mechanism 110 that changes (for example, decelerates) the driving force of the output shaft 105, and a transmission gear mechanism 120 that transmits the driving force changed by the planetary gear mechanism 110 to the piston 182.

<Planetary Gear Mechanism>

Figure 9:
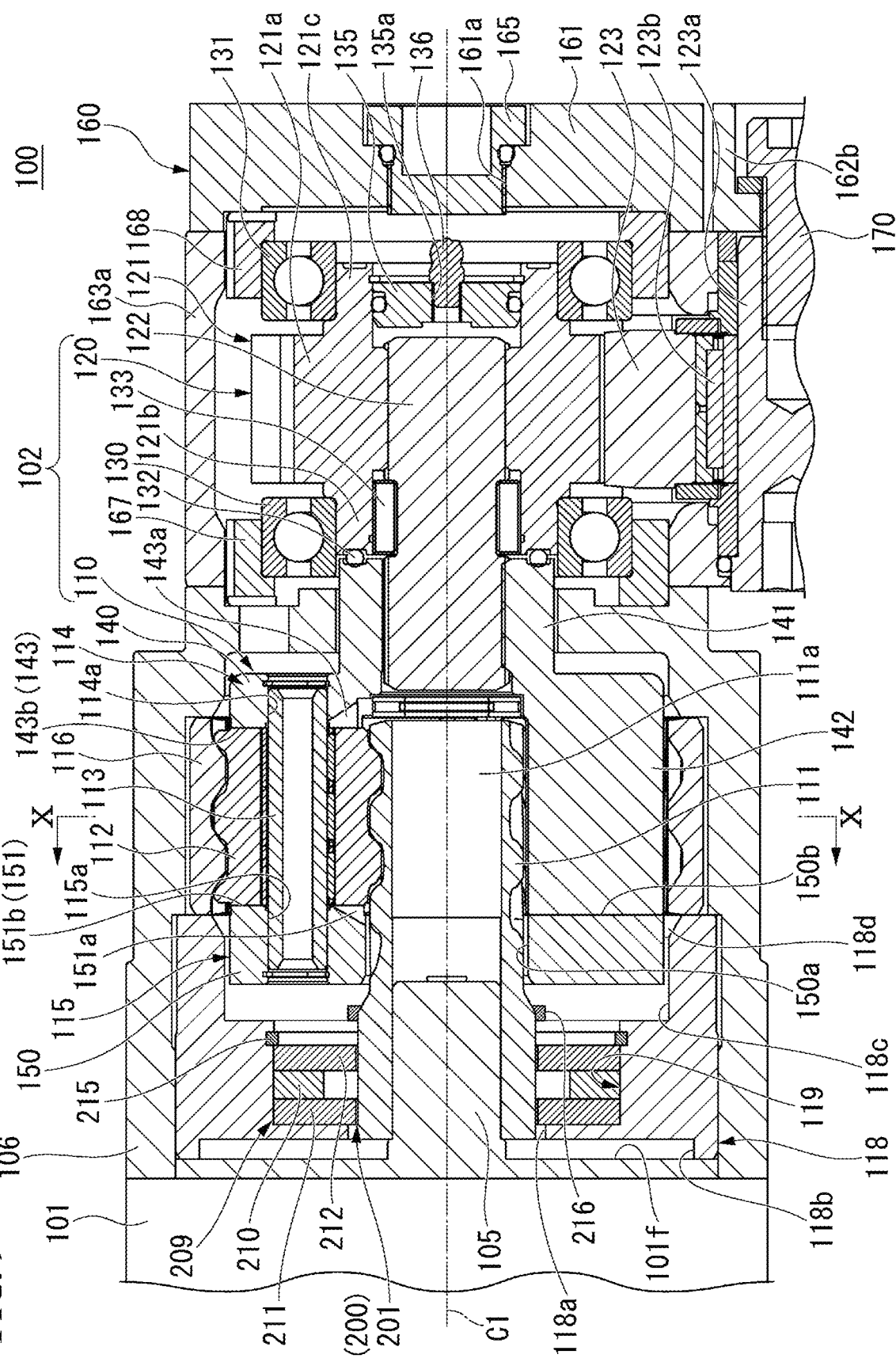
FIG. 9 is an enlarged view of a portion of IX of FIG. 8.

As shown in FIG. 9, the planetary gear mechanism 110 includes a sun gear 111 (an exemplary example of a rotating body) coupled to the output shaft 105, a plurality of planetary gears 112 disposed adjacent to the sun gear 111, carriers 114 and 115 that rotatably support central shafts 113 (hereinafter, also referred to as "planetary shafts 113") of the plurality of planetary gears 112, and a ring gear 116 surrounding the plurality of planetary gears 112. The planetary gear mechanism 110 is covered with a tubular case 106 disposed adjacent to the axial end surface 101f of the motor 101.

<Sun Gear>

The sun gear 111 rotates in response to the rotation of the output shaft 105. The sun gear 111 is formed in a tubular shape coaxial with the output shaft 105. The length of the sun gear 111 in the axial direction is longer than a length of the output shaft 105 that protrudes from the axial end surface 101*f* of the motor 101. An axial base end portion (an end portion on the motor 101 side) of the sun gear 111 is spaced apart from the axial end surface 101*f* of the motor 101. The axial base end portion of the sun gear 111 has a larger diameter than an axial distal end portion (an end portion on a side opposite to the motor 101) of the sun gear 111.

The sun gear 111 has a hollow portion 111*a* that is open such that a lubricant can be accommodated. The hollow portion 111*a* is open outward in the axial direction. The hollow portion 111*a* is a space surrounded by the axial distal end portion of the output shaft 105 and an inner peripheral surface of the sun gear 111. The hollow portion 111*a* is provided between the axial distal end portion of the output shaft 105 and the axial distal end portion of the sun gear 111.

Figure 14:
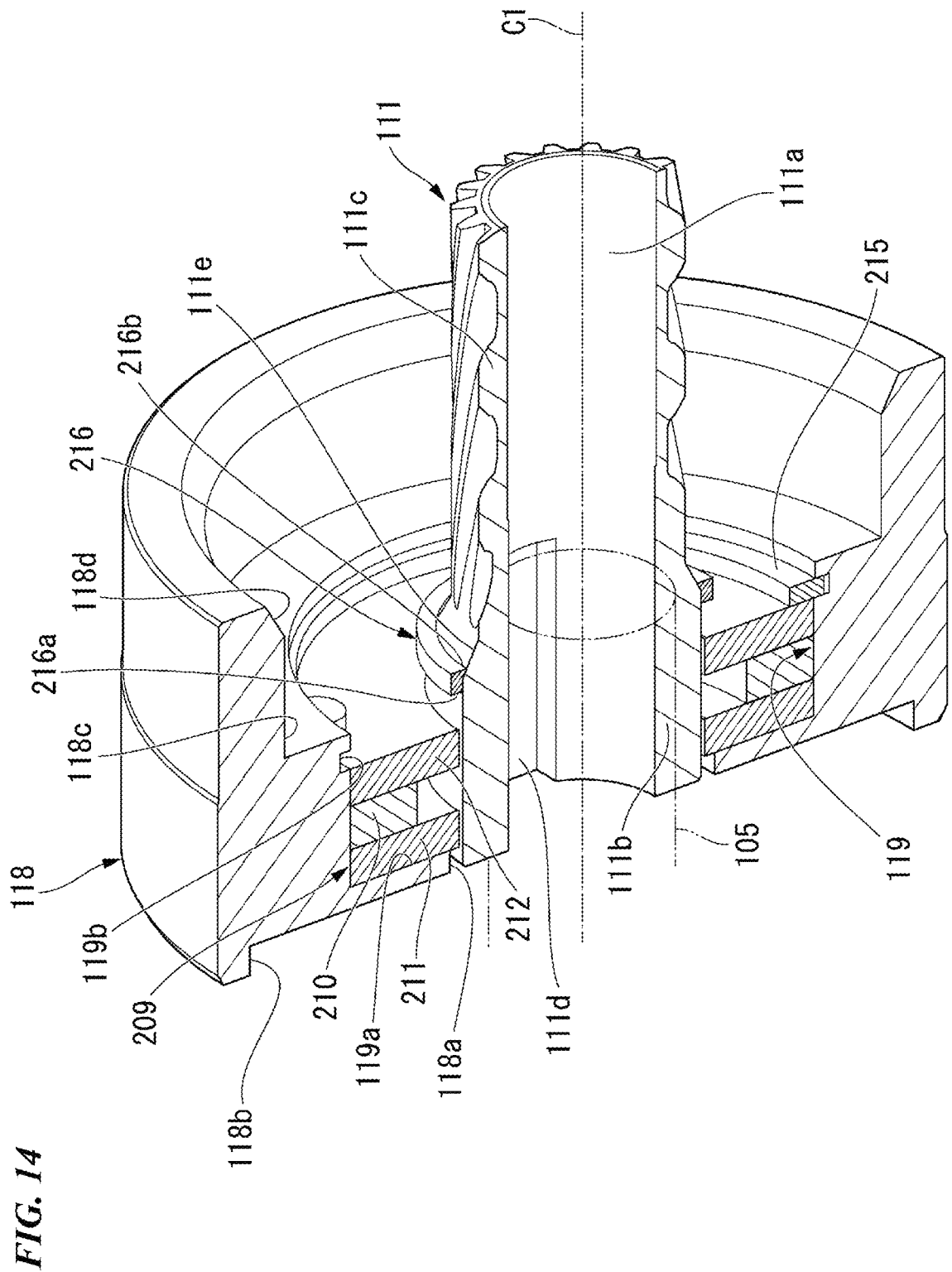
FIG. 14 is a cross-sectional perspective view of the peripheral structure including the fluid holding structure according to the embodiment.

As shown in FIG. 14, the sun gear 111 includes a coupling tubular portion 111*b* coupled to the output shaft 105, and a gear side tubular portion 111*c* coupled to a axial distal end portion of the coupling tubular portion 111*b*. The coupling tubular portion 111*b* is a portion of the sun gear 111 on the axial base end portion side. The coupling tubular portion 111*b* is formed in a tubular shape coaxial with the output shaft 105.

Figure 15:
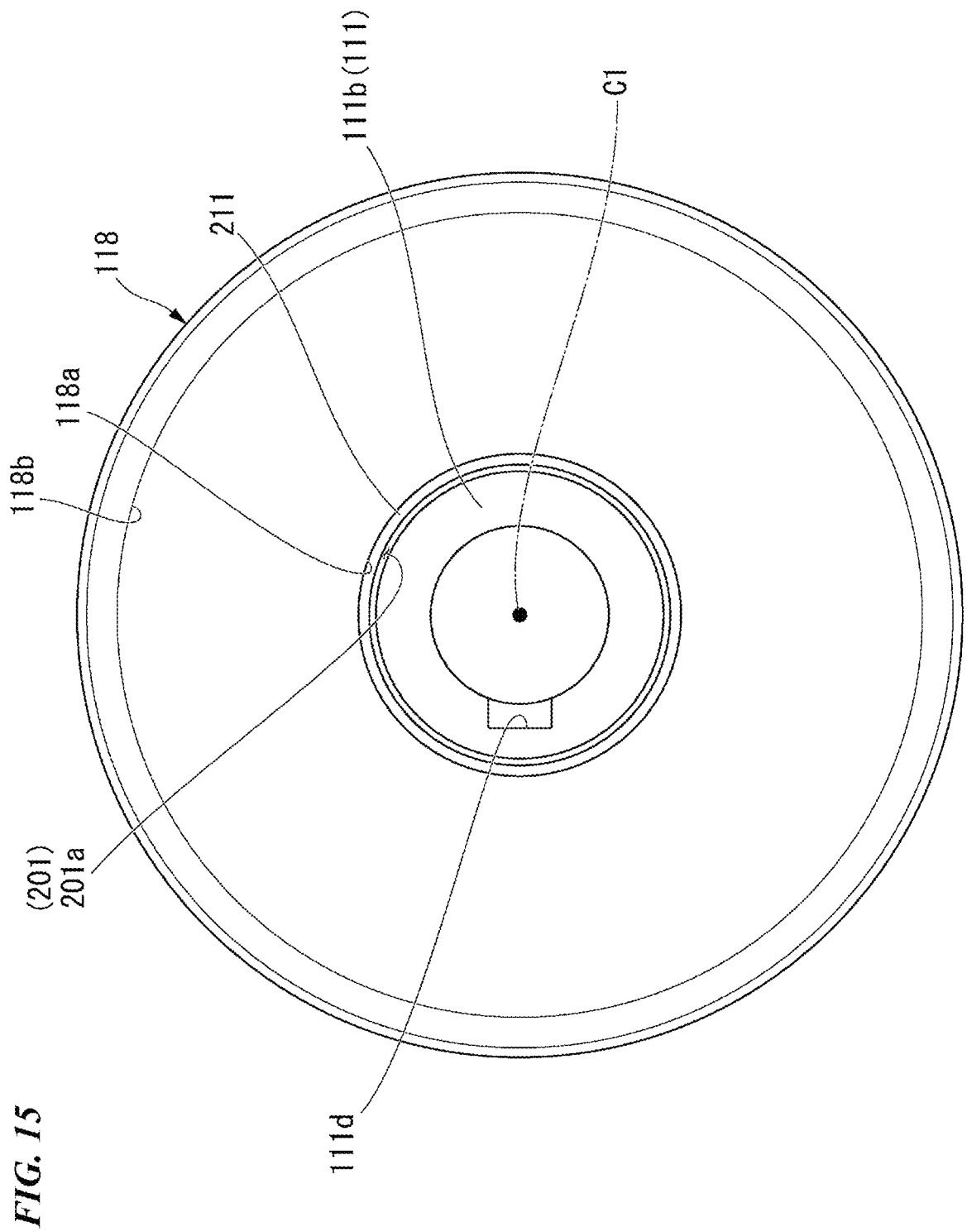
FIG. 15 is a view of the peripheral structure including the fluid holding structure according to the embodiment when viewed from one side in the axial direction.

A key groove 111*d* into which a protrusion portion provided on an outer peripheral surface of the output shaft 105 can be fitted is formed on an inner peripheral surface of the coupling tubular portion 111*b*. The key groove 111*d* extends linearly in the axial direction of the output shaft 105. In FIG. 14, the output shaft 105 is shown by a two-dot chain line. As shown in FIG. 15, the key groove 111*d* is formed in a rectangular recess shape when viewed from the axial direction.

As shown in FIG. 14, the coupling tubular portion 111*b* includes a tapered portion 111*e* that is inclined from an outer peripheral edge of the coupling tubular portion 111*b* toward the axial base end portion of the gear side tubular portion 111*c*. An outer peripheral surface of the tapered portion 111*e* is inclined to be located on an inner side in the radial direction as the outer peripheral surface goes from the outer peripheral edge of the coupling tubular portion 111*b* toward the axial end portion of the gear side tubular portion 111*c*.

Figure 10:
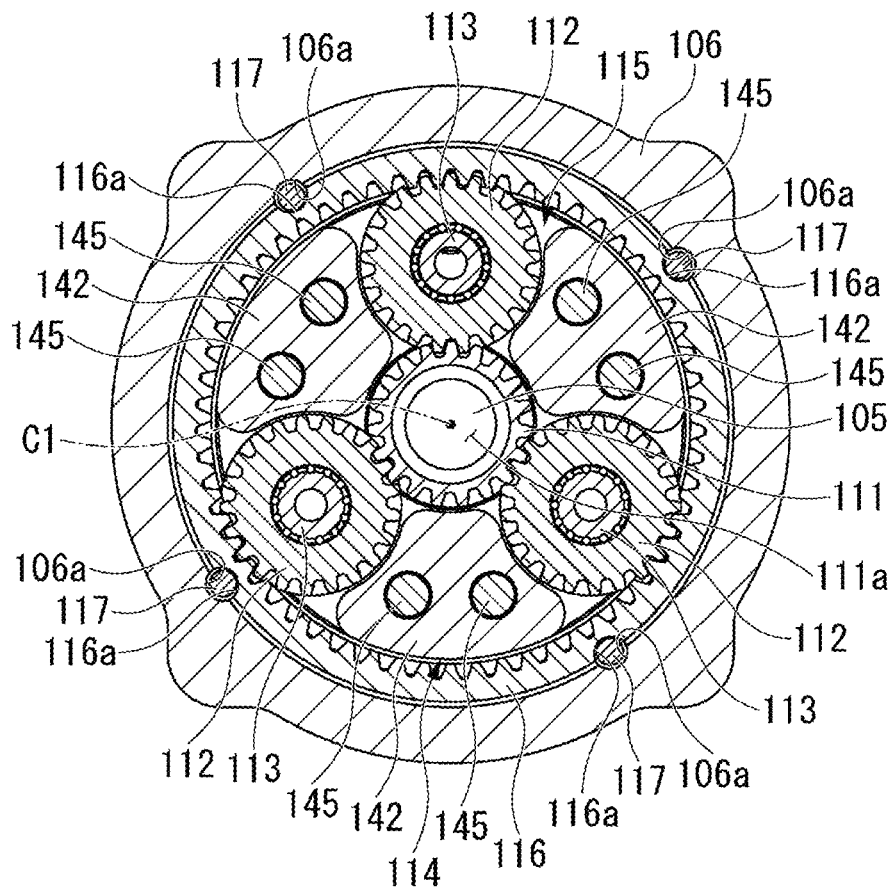
FIG. 10 is a view including a cross section of X-X of FIG. 9.

The gear side tubular portion 111*c* is a portion of the sun gear 111 having outer teeth. The gear side tubular portion 111*c* is a portion of the sun gear 111 on the axial distal end portion side. The gear side tubular portion 111*c* extends outward in the axial direction from the axial distal end portion of the tapered portion 111*e*. The gear side tubular portion 111*c* is formed in a tubular shape coaxial with the coupling tubular portion 111*b*. The gear side tubular portion 111*c* and the coupling tubular portion 111*b* are integrally formed of the same member. As shown in FIG. 10, a tooth surface of the sun gear 111 (an outer tooth surface of the sun gear 111) is in contact with a tooth surface of the planetary gear 112 (an outer tooth surface of the planetary gear 112).

<Planetary Gear>

The planetary gear 112 rotates in response to the rotation of the sun gear 111. As shown in FIG. 10, a plurality (for example, three in the present embodiment) of planetary gears 112 are disposed to be spaced apart from each other at equal intervals along a circumferential direction of the sun gear 111. The outer teeth provided on an outer periphery of the planetary gear 112 mesh with the outer teeth provided on an outer periphery of the sun gear 111. The planetary gear 112 rotates and revolves around the sun gear 111 by meshing with the sun gear 111. The planetary gear 112 can rotate about the planetary shaft 113 that extends parallel to the output shaft 105.

<Carrier>

As shown in FIG. 9, the carriers 114 and 115 are provided coaxially with the output shaft 105. The carriers 114 and 115 support both axial end portions of the planetary shaft 113. The carriers 114 and 115 include guide grooves 143*a* and 151*a* that extend from a position facing the outer periphery of the sun gear 111 toward the planetary shaft 113 and are recessed to allow the lubricant to flow.

The carriers 114 and 115 are a first carrier 114 disposed on the axial distal end portion side of the output shaft 105 and a second carrier 115 disposed on the axial central side of the output shaft 105. As shown in FIG. 10, the first carrier 114 and the second carrier 115 are coupled to each other by a plurality (for example, six in the present embodiment) of bolts 145.

<First Carrier>

Figure 11:
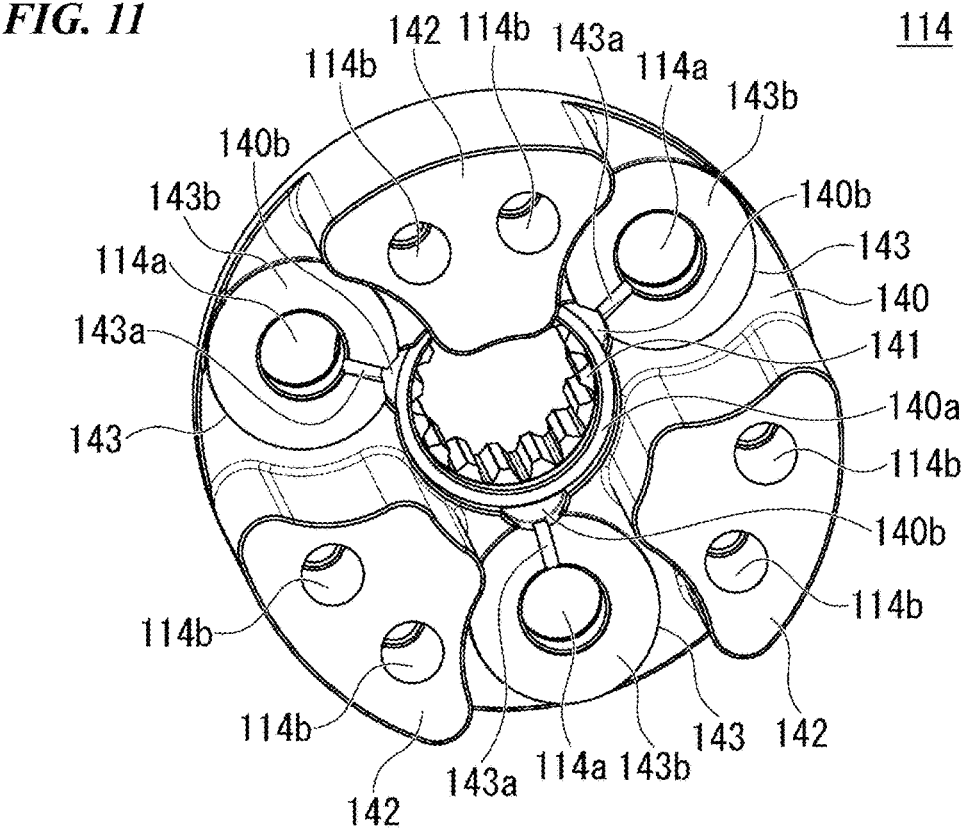
FIG. 11 is a perspective view of a first carrier according to the embodiment.

As shown in FIG. 11, the first carrier 114 includes a first shaft hole 114*a* that is open such that the planetary shaft 113 can be inserted, and a first bolt hole 114*b* that is open such that the bolt 145 (see FIG. 10) can be inserted. The first carrier 114 includes an annular first carrier base portion 140, a tubular carrier distal end tubular body 141 (see FIG. 9) that protrudes outward in the axial direction from the first carrier base portion 140, a plurality of carrier wall portions 142 that extend inward in the axial direction (in a direction opposite to a direction in which the carrier distal end tubular body 141 protrudes) from the first carrier base portion 140, and a first groove forming portion 143 that is provided between two carrier wall portions 142 adjacent to each other in the circumferential direction. The first carrier base portion 140, the carrier distal end tubular body 141, the carrier wall portion 142, and the first groove forming portion 143 are integrally formed of the same member.

As shown in FIG. 9, an outer diameter of the first carrier base portion 140 is larger than an outer diameter of the carrier distal end tubular body 141. An outer peripheral edge of the first carrier base portion 140 is spaced apart from an inner peripheral surface of the case 106 toward the inner side in the radial direction.

As shown in FIG. 11, the first carrier base portion 140 includes an annular groove 140*a* disposed at a position facing the axial distal end portion of the output shaft 105, and a plurality of relay grooves 140*b* connected to the annular groove 140*a*. The annular groove 140*a* is formed in an annular shape along an inner periphery of the first carrier base portion 140. The relay groove 140*b* is curved outward in the radial direction from an outer peripheral edge of the annular groove 140*a*.

The plurality (for example, three in the present embodiment) of carrier wall portions 142 are disposed to be spaced apart from each other at equal intervals along a circumferential direction of the first carrier base portion 140. The carrier wall portion 142 is provided between the outer peripheral edge of the annular groove 140*a* and the outer peripheral edge of the first carrier base portion 140. The carrier wall portion 142 has an outer shape that bulges in the circumferential direction of the first carrier base portion 140 toward the radial outer side of the first carrier base portion 140 when viewed from the axial direction. A side surface of the carrier wall portion 142 in the circumferential direction of the first carrier base portion 140 is curved in an arc shape along the outer shape of the first groove forming portion 143. Two first bolt holes 114b are provided in each carrier wall portion 142.

The plurality (for example, three in the present embodiment) of first groove forming portions 143 are disposed to be spaced apart from each other at equal intervals along the circumferential direction of the first carrier base portion 140. The first groove forming portion 143 is spaced apart from side surfaces of the two carrier wall portions 142 adjacent to each other in the circumferential direction at equal intervals. The first groove forming portion 143 is provided at a position overlapping with the planetary gear 112 when viewed from the axial direction.

The first groove forming portion 143 includes a first guide groove 143a that is recessed to allow the lubricant to flow. The first guide groove 143a is formed on an imaginary line connecting an axial center of the carrier distal end tubular body 141 and an axial center of the first shaft hole 114a when viewed from the axial direction. As shown in FIG. 9, the first guide groove 143a extends from a position facing the axial distal end portion of the sun gear 111 toward the first shaft hole 114a. As shown in FIG. 11, the first guide groove 143a is disposed between the first shaft hole 114a and the relay groove 140b. The depth of the first guide groove 143a gradually increases from the first shaft hole 114a side toward the relay groove 140b.

The first groove forming portion 143 includes a first reception surface 143b that receives an axial outer end surface of the planetary gear 112. The first reception surface 143b is formed in a C-shape that is open at a portion of the first guide groove 143a when viewed from the axial direction. The first reception surface 143b is configured to be in contact with the axial outer end surface of the planetary gear 112 in a portion other than the first guide groove 143a. An inner peripheral edge of the first reception surface 143b is spaced apart from an outer peripheral edge of the first shaft hole 114a toward the outer side in the radial direction.

<Second Carrier>

Figure 12:
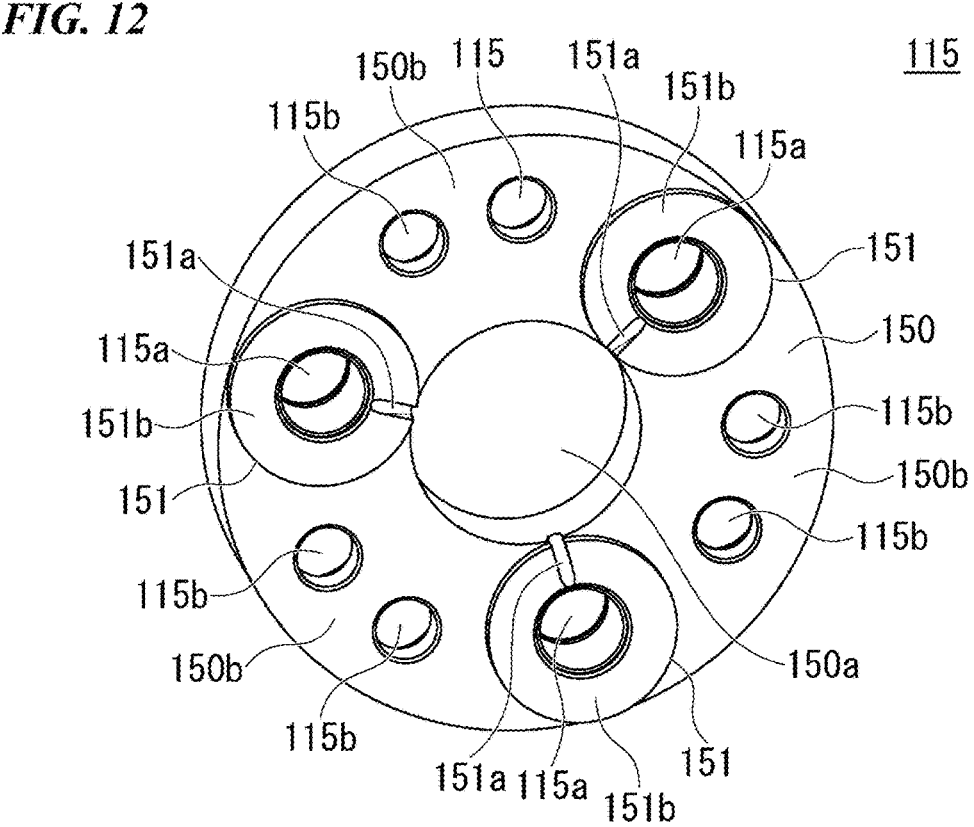
FIG. 12 is a perspective view of a second carrier according to the embodiment.

As shown in FIG. 12, the second carrier 115 includes a second shaft hole 115a that is open such that the planetary shaft 113 can be inserted, and a second bolt hole 115b that is open such that the bolt 145 (see FIG. 10) can be inserted. The second carrier 115 includes an annular second carrier base portion 150 and a second groove forming portion 151 that is provided at a position facing the first groove forming portion 143 (see FIG. 11) in the axial direction. The second carrier base portion 150 and the second groove forming portion 151 are integrally formed of the same material.

As shown in FIG. 9, an outer diameter of the second carrier base portion 150 is substantially the same as the outer diameter of the first carrier base portion 140. An outer peripheral edge of the second carrier base portion 150 is spaced apart from the inner peripheral surface of the case 106 toward the inner side in the radial direction.

The second carrier base portion 150 has an opening portion 150a that is open such that the output shaft 105 can be inserted. The second carrier base portion 150 includes a wall reception portion 150b that receives the carrier wall portion 142 of the first carrier 114.

The wall reception portion 150b is provided at a position overlapping with the carrier wall portion 142 when viewed from the axial direction. As shown in FIG. 12, a plurality (for example, three in the present embodiment) of wall reception portions 150b are provided to correspond to the carrier wall portions 142. Two second bolt holes 115b are provided in each wall reception portion 150b.

The plurality (for example, three in the present embodiment) of second groove forming portions 151 are disposed to be spaced apart from each other at equal intervals along a circumferential direction of the second carrier base portion 150. The second groove forming portion 151 is provided at a position overlapping with the planetary gear 112 when viewed from the axial direction.

The second groove forming portion 151 includes a second guide groove 151a that is recessed to allow the lubricant to flow. The second guide groove 151a is formed on an imaginary line connecting a center of the opening portion 150a and an axial center of the second shaft hole 115a when viewed from the axial direction. As shown in FIG. 9, the second guide groove 151a extends from a position facing the outer periphery of the sun gear 111 toward the second shaft hole 115a. As shown in FIG. 12, the second guide groove 151a is disposed between the second shaft hole 115a and the opening portion 150a. A depth of the second guide groove 151a gradually increases from the second shaft hole 115a side toward the opening portion 150a.

The second groove forming portion 151 includes a second reception surface 151b that receives an axial inner end surface of the planetary gear 112. The second reception surface 151b is formed in a C-shape that is open at a portion of the second guide groove 151a when viewed from the axial direction. The second reception surface 151b is configured to be in contact with the axial inner end surface of the planetary gear 112 in a portion other than the second guide groove 151a. An inner peripheral edge of the second reception surface 151b is spaced apart from an outer peripheral edge of the second shaft hole 115a toward the outer side in the radial direction.

<Ring Gear>

As shown in FIG. 10, inner teeth provided on an inner periphery of the ring gear 116 mesh with the outer teeth provided on the outer periphery of each planetary gear 112. A plurality of gear side recess portions 116a into which the rotation stop pins 117 enter are provided in an outer peripheral surface of the ring gear 116. The plurality (for example, four in the present embodiment) of gear side recess portions 116a are spaced apart from each other at equal intervals in the circumferential direction.

A plurality of case side recess portions 106a into which the rotation stop pins 117 enter are provided in an inner peripheral surface of the case 106. The plurality (for example, four in the present embodiment) of case side recess portions 106a are spaced apart from each other at equal intervals in the circumferential direction. For example, by inserting the rotation stop pin 117 into each of the recess portions 106a and 116a in a state in which the circumferential positions of the gear side recess portion 116a and the case side recess portion 106a are aligned with each other, the rotation of the ring gear 116 can be stopped (the ring gear 116 is restricted from moving in the circumferential direction with respect to the case 106).

<Holder>

As shown in FIG. 9, the electric cylinder 100 includes a holder 118 disposed adjacent to the axial end surface 101f of the motor 101. The holder 118 is disposed between the axial end surface 101f of the motor 101 and the carriers 114 and 115. The holder 118 is formed to surround the space between the axial end surface 101f of the motor 101 and the second carrier 115 from the outer side in the radial direction.

Figure 17:
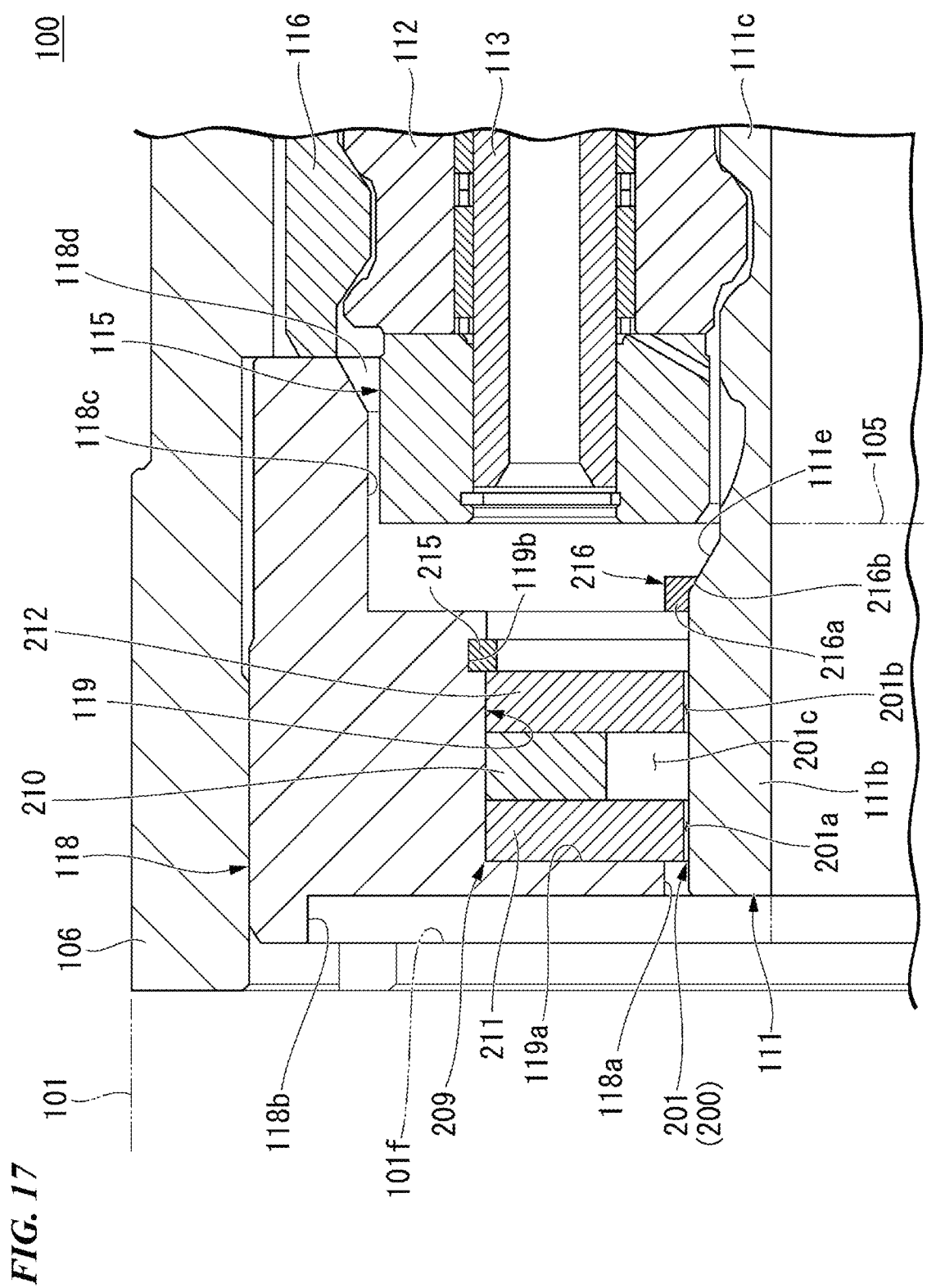
FIG. 17 is a view including a cross section of XVII-XVII of FIG. 16.

As shown in FIG. 17, the holder 118 includes a fluid accommodation portion 201 that can accommodate a magnetic fluid 200 between the holder 118 and the outer periphery of the sun gear 111. For example, the magnetic fluid 200 is a liquid in which magnetic fine particles, such as magnetite, are dispersed in a base liquid by a surfactant. The thermal conductivity of the magnetic fluid 200 is higher than the thermal conductivity of air. It should be noted that the aspect of the magnetic fluid 200 can be changed depending on the required specifications.

The holder 118 is formed in a tubular shape. The holder 118 includes a through-hole 118a that is open in the axial direction of the motor 101 with a gap from the outer peripheral edge (radial outer end edge) of the coupling tubular portion 111b of the sun gear 111. The gap of the through-hole 118a is formed to have a size through which the lubricant can flow. The holder 118 includes an inner recess portion 118b that is open inward in the axial direction at a position facing the axial end surface 101f of the motor 101, an outer recess portion 118c that is open outward in the axial direction such that the second carrier 115 can be accommodated, and an accommodation recess portion 119 that is open outward in the axial direction at a position facing the fluid accommodation portion 201. In FIG. 17, the motor 101 and the output shaft 105 are indicated by two-point chain lines.

The through-hole 118a allows the radial central portions (portions on the sun gear 111 side) of the inner recess portion 118b and the accommodation recess portion 119 to communicate with each other in the axial direction. An axial inner end portion of the through-hole 118a is connected to the radial central portion of the inner recess portion 118b. An axial outer end portion of the through-hole 118a is connected to the radial central portion of the accommodation recess portion 119. An inner diameter of the inner recess portion 118b is larger than an inner diameter of the outer recess portion 118c. An inner diameter of the accommodation recess portion 119 is smaller than the inner diameter of the outer recess portion 118c. An inner peripheral edge of the outer recess portion 118c is spaced apart from an outer peripheral edge of the second carrier 115 toward the outer side in the radial direction. An inner peripheral surface of the outer recess portion 118c is disposed on the axial outer side of the motor 101 with respect to the fluid accommodation portion 201. The inner peripheral surface of the outer recess portion 118c is disposed on the radial outer side of the sun gear 111 with respect to the fluid accommodation portion 201. An inner peripheral surface of the accommodation recess portion 119 is disposed on the radial inner side of the sun gear 111 with respect to the inner peripheral surface of the outer recess portion 118c.

Figure 13:
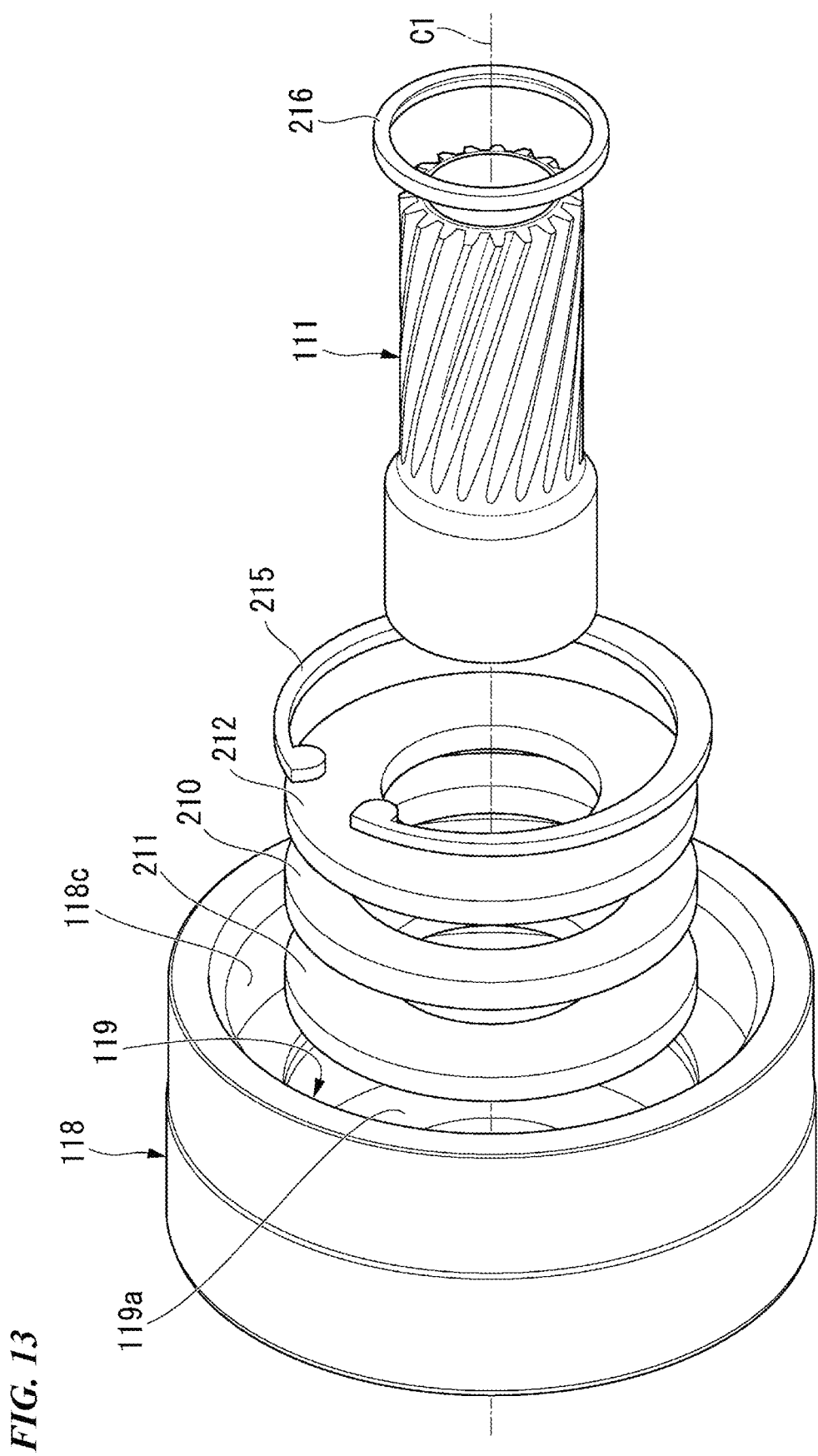
FIG. 13 is an exploded perspective view of a peripheral structure including a fluid holding structure according to the embodiment.

As shown in FIG. 13, the accommodation recess portion 119 has a support surface 119a formed in an annular shape coaxial with the sun gear 111. As shown in FIG. 17, the support surface 119a extends in the radial direction of the sun gear 111. The support surface 119a is formed parallel to an axial inner surface of the inner recess portion 118b.

The holder 118 includes a holder side groove 118d that extends from the inner peripheral edge of the outer recess portion 118c toward an axial inner end portion of the ring gear 116 and is recessed to allow the lubricant to flow. The depth of the holder side groove 118d gradually increases from the inner peripheral edge side of the outer recess portion 118c toward the axial inner end portion of the ring gear 116.

<Magnetic Pole Piece>

The electric cylinder 100 includes a pair of magnetic pole pieces 211 and 212 provided on an inner peripheral surface of the holder 118. The pair of magnetic pole pieces 211 and 212 are provided on the inner peripheral surface of the accommodation recess portion 119. As shown in FIG. 13, the pair of magnetic pole pieces 211 and 212 are formed in an annular shape coaxial with the sun gear 111. The pair of magnetic pole pieces 211 and 212 are a first magnetic pole piece 211 disposed between the support surface 119a of the holder 118 and a magnet 210, and a second magnetic pole piece 212 disposed adjacent to a surface of the magnet 210 opposite to the first magnetic pole piece 211. The first magnetic pole piece 211 and the second magnetic pole piece 212 are formed in a ring shape having the same size as each other.

As shown in FIG. 17, for example, it is preferable that outer peripheral surfaces of the magnetic pole pieces 211 and 212 are in contact with the inner peripheral surface of the accommodation recess portion 119. As a result, the radial misregistration of the magnetic pole pieces 211 and 212 with respect to the inner peripheral surface of the accommodation recess portion 119 can be suppressed.

<Magnet>

The electric cylinder 100 includes the magnet 210 disposed between the pair of magnetic pole pieces 211 and 212. The magnet 210 holds the magnetic fluid 200 in the fluid accommodation portion 201 by using the action of the magnetic field. As shown in FIG. 13, the magnet 210 is formed in an annular shape coaxial with the sun gear 111. The magnet 210 has a ring shape magnetized in the axial direction. The magnet 210 is formed in a ring shape having a larger inner diameter larger than the magnetic pole pieces 211 and 212. The magnet 210 has the same outer diameter as the magnetic pole pieces 211 and 212. As shown in FIG. 17, an inner peripheral surface of the magnet 210 is disposed on the radial outer side of the sun gear 111 with respect to the inner peripheral surfaces of the magnetic pole pieces 211 and 212.

For example, it is preferable that the magnet 210 is in contact with the inner peripheral surface of the accommodation recess portion 119. As a result, it is possible to suppress the radial misregistration of the magnet 210 with respect to the inner peripheral surface of the accommodation recess portion 119.

The magnet 210 holds the magnetic fluid 200 in the fluid accommodation portion 201 in cooperation with the first magnetic pole piece 211 and the second magnetic pole piece 212. The magnet 210, the first magnetic pole piece 211, and the second magnetic pole piece 212 constitute a fluid holding structure 209 that holds the magnetic fluid 200 in the fluid accommodation portion 201. In the present embodiment, one fluid holding structure 209 is provided on the inner peripheral surface of the accommodation recess portion 119 of the holder 118.

<Retaining Ring>

Figure 16:
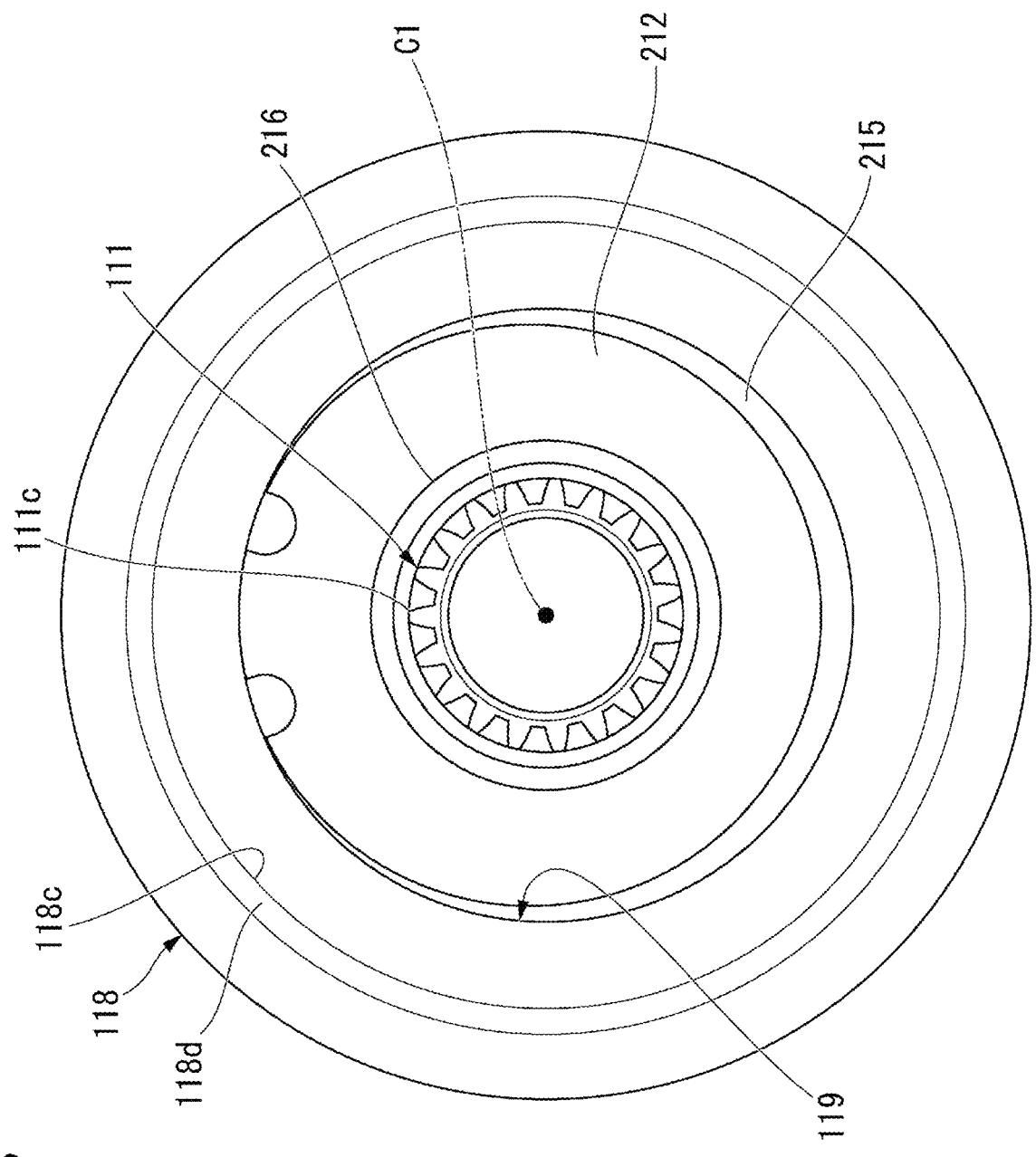
FIG. 16 is a view of the peripheral structure including the fluid holding structure according to the embodiment when viewed from the other side in the axial direction.

The electric cylinder 100 includes a retaining ring 215 that stops the second magnetic pole piece 212 from coming off outward in the axial direction of the motor 101. For example, the retaining ring 215 is a snap ring. The retaining ring 215 is disposed adjacent to a surface of the second magnetic pole piece 212 opposite to the magnet 210. As shown in FIG. 16, the retaining ring 215 is formed in a C-shape when viewed from the axial direction. The retaining ring 215 is formed in an arc shape that overlaps with an outer peripheral portion of the second magnetic pole piece 212 when viewed from the axial direction.

As shown in FIG. 17, the holder 118 includes a fitting groove 119b that is recessed to allow the retaining ring 215 to be fitted. The fitting groove 119b is disposed in the vicinity of the axial outer end on the inner peripheral surface of the accommodation recess portion 119. The fitting groove 119b is recessed outward in the radial direction over the entire circumference of the inner peripheral surface of the accommodation recess portion 119. The fitting groove 119b is formed in an annular shape along the inner periphery of the accommodation recess portion 119. The fitting groove 119b is formed in an annular shape along an outer periphery of the retaining ring 215. The first magnetic pole piece 211, the magnet 210, and the second magnetic pole piece 212 are disposed and arranged in this order in the axial direction between the support surface 119a of the holder 118 and the retaining ring 215.

For example, in a state in which the retaining ring 215 is fitted into the fitting groove 119b, it is preferable that the surfaces of the support surface 119a of the accommodation recess portion 119, the first magnetic pole piece 211, the magnet 210, the second magnetic pole piece 212, and the retaining ring 215 are in contact with each other, the surfaces being adjacent to each other in the axial direction. As a result, the misregistration of the first magnetic pole piece 211, the magnet 210, and the second magnetic pole piece 212 in the axial direction with respect to the support surface 119a of the accommodation recess portion 119 can be suppressed.

<Fluid Accommodation Portion>

The fluid accommodation portion 201 is provided to surround the outer periphery (the outer periphery of the coupling tubular portion 111b) of the sun gear 111 on the axial base end portion side in the circumferential direction. The fluid accommodation portion 201 is partitioned by the outer peripheral surface (an outer peripheral surface of the coupling tubular portion 111b) of the sun gear 111 on the axial base end portion, the inner peripheral surfaces of the pair of magnetic pole pieces 211 and 212, and the inner peripheral surface of the magnet 210. The fluid accommodation portion 201 includes gaps 201a and 201b that allow the magnetic fluid 200 to be accommodated between the outer peripheral surface of the sun gear 111 and the inner peripheral surfaces of the magnetic pole pieces 211 and 212, and a space 201c that allows the magnetic fluid 200 to be accommodated between the outer peripheral surface of the sun gear 111 and the inner peripheral surface of the magnet 210.

Hereinafter, the gap 201a between the outer peripheral surface of the sun gear 111 and the inner peripheral surface of the first magnetic pole piece 211 will also be referred to as a "first gap 201a", and the gap 201b between the outer peripheral surface of the sun gear 111 and the inner peripheral surface of the second magnetic pole piece 212 will also be referred to as a "second gap 201b". The first gap 201a and the second gap 201b communicate with each other through the space 201c. The magnetic fluid 200 is accommodated in the first gap 201a, the second gap 201b, and the space 201c.

For example, the sun gear 111 may be formed of a magnetic material. For example, at least a portion (the coupling tubular portion 111b) of the sun gear 111 facing the fluid accommodation portion 201 may be formed of a magnetic material. In this configuration, due to the action of the magnetic field caused by the magnet 210, the magnetic pole pieces 211 and 212, and the sun gear 111, the magnetic fluid 200 can be held in the fluid accommodation portion 201.

<Capturing Portion>

The electric cylinder 100 includes a capturing portion 216 that can capture the lubricant attempting to flow from the axial distal end portion side of the sun gear 111 toward the fluid accommodation portion 201. The capturing portion 216 protrudes from the outer peripheral surface of the sun gear 111 toward the inner peripheral surface of the outer recess portion 118c. As shown in FIG. 16, the capturing portion 216 is formed in an annular shape coaxial with the sun gear 111. For example, the capturing portion 216 is an annular member that can be attached to the outer peripheral surface of the sun gear 111 by press-fitting.

As shown in FIG. 14, the capturing portion 216 includes a first annular portion 216a that has a ring shape along the outer periphery of the coupling tubular portion 111b of the sun gear 111, and a second annular portion 216b that has a ring shape coupled to the first annular portion 216a and extending along the outer periphery of the tapered portion 111e. The first annular portion 216a and the second annular portion 216b are integrally formed of the same member.

An inner peripheral surface of the first annular portion 216a is in contact with the outer peripheral surface of the coupling tubular portion 111b. An inner peripheral surface of the second annular portion 216b is in contact with the outer peripheral surface of the tapered portion 111e. The inner peripheral surface of the second annular portion 216b is inclined from the inner peripheral edge of the first annular portion 216a along the outer peripheral surface of the tapered portion 111e. As shown in FIG. 17, an axial distal end surface of the second annular portion 216b extends in the radial direction of the sun gear 111.

In a cross-sectional view of FIG. 17, a cross-sectional shape of the capturing portion 216 on the radial distal end side is a rectangular protruding shape. It should be noted that the cross-sectional shape of the capturing portion 216 on the radial distal end side may be a shape other than the rectangular protruding shape, such as an arc shape, a trapezoidal shape, or a triangular shape. For example, the cross-sectional shape of the capturing portion 216 on the radial distal end side can be changed depending on the required specifications.

<Transmission Gear Mechanism>

As shown in FIG. 8, the transmission gear mechanism 120 includes a transfer gear 121 that transmits the rotational force of the carriers 114 and 115 to the piston 182, a transfer shaft 122 that extends outward in the axial direction from a position facing an axial outer end of the sun gear 111, an idler gear 123 that is disposed adjacent to the transfer gear 121, and a driven gear 124 that is disposed on a side opposite to the transfer gear 121 across the idler gear 123. The transmission gear mechanism 120 is covered with a cover unit 160 disposed adjacent to the case 106.

As shown in FIG. 9, the transfer gear 121 is provided coaxially with the output shaft 105. The transfer gear 121 is formed in a tubular shape that is open such that the transfer shaft 122 can be inserted. The transfer gear 121 includes a tubular gear body 121a having outer teeth that mesh with the idler gear 123, an inner tubular body 121b that protrudes inward in the axial direction from the gear body 121a, and an outer tubular body 121c that protrudes outward in the axial direction from the gear body 121a. The gear body 121a, the inner tubular body 121b, and the outer tubular body 121c are integrally formed of the same member. The transfer gear 121 is rotatably supported by the cover unit 160 about the motor axis C1 by an inner bearing 130 provided on the outer periphery of the inner tubular body 121b and an outer bearing 131 provided on the outer periphery of the outer tubular body 121c.

The transfer shaft 122 is provided coaxially with the output shaft 105. The carrier distal end tubular body 141 is coupled to the transfer shaft 122 on the one end portion side in the axial direction via a spline. The inner teeth having the tooth surfaces parallel to the axial direction of the carrier distal end tubular body 141 are provided on an inner periphery of the carrier distal end tubular body 141. The outer teeth having the tooth surfaces parallel to the axial direction of the transfer shaft 122 and meshing with the inner teeth of the carrier distal end tubular body 141 are provided on the outer periphery of the transfer shaft 122 on the one end portion side in the axial direction. A gap through which the lubricant can flow is formed between the outer teeth of the transfer shaft 122 on the one end portion side in the axial direction and the inner teeth of the carrier distal end tubular body 141.

The gear body 121a of the transfer gear 121 is coupled to the transfer shaft 122 on the other end portion side in the axial direction via a spline. The inner teeth having the tooth surfaces parallel to the axial direction of the transfer gear 121 are provided on an inner periphery of the gear body 121a. The outer teeth having the tooth surfaces parallel to the axial direction of the transfer shaft 122 and meshing with the inner teeth of the gear body 121a are provided on the outer periphery of the transfer shaft 122 on the other end portion side in the axial direction. A gap through which the lubricant can flow is formed between the outer teeth of the transfer shaft 122 on the other end portion side in the axial direction and the inner teeth of the gear body 121a.

An axial inner end portion of the inner tubular body 121b is connected to a distal end portion of the carrier distal end tubular body 141 via an O-ring 132. The bearing 133 is provided between an inner periphery of the inner tubular body 121b and an outer periphery of an axial central portion of the transfer shaft 122. For example, the bearing 133 is composed of a pair of semi-circular arc-shaped rings (so-called half-split rings). A gap through which the lubricant can flow is formed between the axial central portion of the transfer shaft 122 and the bearing 133.

A cover member 135 is attachably and detachably attached to the outer tubular body 121c. The cover member 135 includes a supply hole 135a that is open such that the lubricant can be supplied from the outside to the other end portion side in the axial direction of the transfer shaft 122. The supply hole 135a is formed on the motor axis C1. A gap through which the lubricant can flow is formed between an axial outer end portion of the transfer shaft 122 and the cover member 135.

A grease nipple 136 that can be opened and closed such that the lubricant can be supplied from the outside to the supply hole 135a is provided in the cover member 135. The grease nipple 136 is provided on the motor axis C1. The grease nipple 136 extends outward in the axial direction with respect to the cover member 135. The grease nipple 136 includes an injection port (not shown) of the lubricant that communicates with the supply hole 135a. The grease nipple 136 has a check valve in which a ball is pressed by a spring from the inside with respect to the injection port. For example, the grease nipple 136 can be opened by applying pressure to the grease nipple 136 by connecting a grease gun or the like, and the lubricant can be supplied to the supply hole 135a through the injection port.

The idler gear 123 rotates in response to the rotation of the transfer gear 121. The idler gear can rotate about an idler shaft 123a extending parallel to the transfer shaft 122. The idler gear 123 is formed in a tubular shape that is open such that the idler shaft 123a can be inserted. A bearing 123b is provided between an inner periphery of the idler gear 123 and an outer periphery of the idler shaft 123a.

As shown in FIG. 8, the driven gear 124 is disposed adjacent to the idler gear 123. The driven gear 124 rotates in response to the rotation of the idler gear 123. The driven gear 124 is provided coaxially with a cylinder shaft 180 accommodated inside the cylinder body 103. Reference numeral C2 in the drawing indicates a cylinder axis along the cylinder shaft 180.

The driven gear 124 is formed in a tubular shape that is open such that a first end portion of the cylinder shaft 180 can be inserted. The driven gear 124 includes a tubular gear body 124a having outer teeth that mesh with the idler gear 123, an inner tubular body 124b that protrudes inward in the axial direction from the gear body 124a, and an outer tubular body 124c that protrudes outward in the axial direction from the gear body 124a. The gear body 124a, the inner tubular body 124b, and the outer tubular body 124c are integrally formed of the same member.

The driven gear 124 is rotatably supported by the cover unit 160 about the cylinder axis C2 by an inner bearing 155 provided on the outer periphery of the inner tubular body 124b and an outer bearing 156 provided on the outer periphery of the outer tubular body 124c.

In the drawing, reference numeral 137 indicates a cover member provided to be attachable to and detachable from the outer tubular body 124c, and reference numeral 138 indicates a grease nipple that is provided on the cover member 137 and that can be opened and closed such that the lubricant can be supplied from the outside to the supply hole of the cover member 137.

<Cover Unit>

The cover unit 160 includes a first cover 161 that covers the transfer gear 121 from the outer side in the axial direction, a second cover 162 that covers the driven gear 124 from the outer side in the axial direction, and a third cover 163 that covers the transfer gear 121, the idler gear 123, and the driven gear 124 from the radial outer side each gear.

Figure 7:
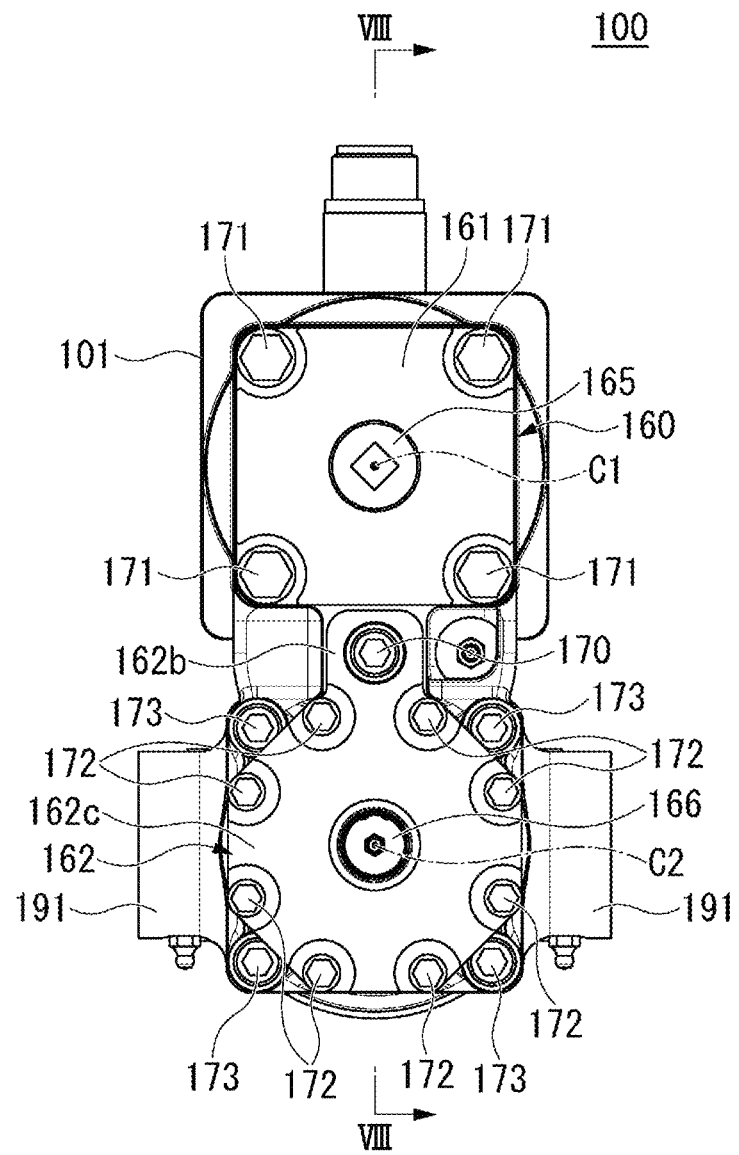
FIG. 7 is a view of the electric cylinder according to the embodiment when viewed from the other side in the axial direction.

As shown in FIG. 7, the first cover 161 has a rectangular shape when viewed from the axial direction. As shown in FIG. 9, the first cover 161 includes a first supply opening 161a that is open such that the lubricant can be supplied from the outside to the other end portion side in the axial direction of the transfer shaft 122. The first supply opening 161a is formed on the motor axis C1. A gap through which the lubricant can flow is formed between an axial outer end portion of the transfer gear 121 and the first cover 161. A first lid member 165 is attachably and detachably attached to the first cover 161 such that the first supply opening 161a can be opened and closed.

As shown in FIG. 8, the second cover 162 includes a second supply opening 162a that is open such that the lubricant can be supplied from the outside to the first end portion side of the cylinder shaft 180. The second supply opening 162a is formed on the cylinder axis C2. A gap through which the lubricant can flow is formed between an axial outer end portion of the driven gear 124 and the second cover 162. A second lid member 166 is attachably and detachably attached to the second cover 162 such that the second supply opening 162a can be opened and closed.

As shown in FIG. 7, the second cover 162 includes an idler cover portion 162b provided at a position overlapping with the idler gear 123 and a driven cover portion 162c provided at a position overlapping with the driven gear 124, when viewed from the axial direction. The idler cover portion 162b and the driven cover portion 162c are integrally formed of the same material. As shown in FIG. 9, the idler cover portion 162b fixes the idler shaft 123a via a bolt 170.

As shown in FIG. 5, the third cover 163 includes a case side cover portion 163a provided between the case 106 and the first cover 161, and a screw side cover portion 163*b* provided between the cylinder body 103 and the second cover 162.

As shown in FIG. 9, the case side cover portion 163*a* is opened coaxially with the motor axis C1. In the drawing, reference numeral 167 indicates an inner spacer provided between an inner peripheral surface of an axial inner portion of the case side cover portion 163*a* and the inner bearing 130, and reference numeral 168 indicates an outer spacer provided between an inner peripheral surface of an axial outer portion of the case side cover portion 163*a* and the outer bearing 131.

As shown in FIG. 5, the first cover 161 is jointly fastened to the case 106 via the case side cover portion 163*a* by using a plurality (for example, four in the present embodiment) of bolts 171. An axial inner end portion of the case side cover portion 163*a* is coupled to an axial outer end portion of the case 106 via the joint fastening using the bolt 171.

The driven cover portion 162*c* is fixed to the screw side cover portion 163*b* via a plurality (for example, eight in the present embodiment) of bolts 172. The screw side cover portion 163*b* is fixed to the cylinder body 103 via a plurality (for example, four in the present embodiment) of bolts 173.

<Cylinder Body>

As shown in FIG. 8, the cylinder body 103 includes the cylinder shaft 180, a nut 181 screwed onto a screw shaft 180*a* of the cylinder shaft 180, the piston 182 provided on an outer periphery of the nut 181, a tubular piston rod 183 coupled to the piston 182, a joint member 184 provided at a distal end portion of the piston rod 183, a tubular cylinder tube 185 that accommodates the piston rod 183, a holding member 186 provided between a first end portion of the cylinder tube 185 and the screw side cover portion 163*b*, and a rod cover 187 provided at a second end portion of the cylinder tube 185.

A ball (not shown) intervenes between the screw shaft 180*a* and the nut 181. The screw shaft 180*a* and the nut 181 constitute a ball screw that converts rotational movement of the motor 101 into linear movement. The nut 181 is coupled to the piston 182 via a plurality of bolts. The piston 182 is configured to move integrally with the nut 181 on the screw shaft 180*a*. The piston rod 183 is configured to move integrally with the piston 182 along the cylinder axis C2.

Figure 6:
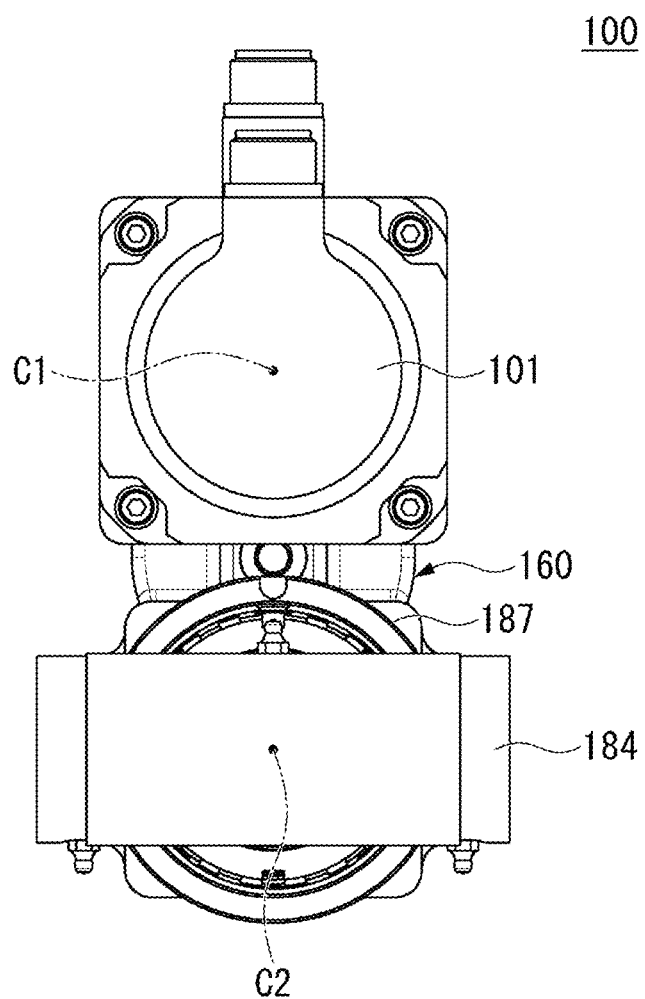
FIG. 6 is a view of the electric cylinder according to the embodiment when viewed from one side in an axial direction.

As shown in FIG. 6, the joint member 184 protrudes outward from an outer peripheral edge of the rod cover 187. As shown in FIG. 8, the joint member 184 has a connection hole 184*a* that is open in a direction orthogonal to the cylinder axis C2. A bearing 188 is provided between an inner peripheral surface of the cylinder tube 185 and an outer peripheral surface of the piston 182.

As shown in FIG. 5, the holding member 186 includes a tubular holding portion body 190 and a trunnion portion 191 that protrudes outward in the radial direction from the holding portion body 190.

As shown in FIG. 8, the holding portion body 190 is opened coaxially with the cylinder axis C2. A plurality of bearings 189 are provided between an inner peripheral surface of the holding portion body 190 and the screw shaft 180*a*. As shown in FIG. 5, the trunnion portion 191 includes a connection hole 191*a* that is open in a direction orthogonal to the cylinder axis C2. The connection hole 191*a* of the trunnion portion 191 is open parallel to the connection hole 184*a* of the joint member 184.

<Operation of Electric Cylinder>

Hereinafter, an exemplary example of an operation of the electric cylinder 100 will be described.

As shown in FIG. 8, the driving force from the motor 101 is decelerated through the power transmission unit 102 and is transmitted to the cylinder shaft 180. Specifically, the driving force from the motor 101 is the rotational force about the motor axis C1, and is decelerated by the output shaft 105, the sun gear 111, the plurality of planetary gears 112, and the carriers 114 and 115. The rotational force decelerated by the carriers 114 and 115 is transmitted to the transfer gear 121 through the transfer shaft 122. The rotational force transmitted to the transfer gear 121 is transmitted to the cylinder shaft 180 through the idler gear 123 and the driven gear 124.

For example, in a case in which the motor 101 rotates in a forward direction, the cylinder shaft 180 rotates in one direction about the cylinder axis C2. The nut 181 screwed onto the screw shaft 180*a* of the cylinder shaft 180 moves on the cylinder axis C2 in a direction of an arrow M1 in response to the rotation of the cylinder shaft 180 in the one direction. The piston 182, the piston rod 183, and the joint member 184 integrally move in the direction of the arrow M1 in response to the movement of the nut 181 in the direction of the arrow M1. As a result, the cylinder body 103 expands.

On the other hand, in a case in which the motor 101 rotates in a reverse direction from a state in which the cylinder body 103 expands, the cylinder shaft 180 rotates in the other direction about the cylinder axis C2. The nut 181 screwed onto the screw shaft 180*a* of the cylinder shaft 180 moves on the cylinder axis C2 in a direction opposite to the direction of the arrow M1 in response to the rotation of the cylinder shaft 180 in the other direction. The piston 182, the piston rod 183, and the joint member 184 integrally move in the direction opposite to the direction of the arrow M1 in response to the movement of the nut 181 in the direction opposite to the direction of the arrow M1. As a result, the cylinder body 103 contracts.

As described above, the electric cylinder 100 is configured such that the cylinder body 103 expands and contracts in response to the forward and reverse rotation of the motor 101.

<Flow of Lubricant>

Hereinafter, an exemplary example of a flow of the lubricant will be described.

Figure 18:
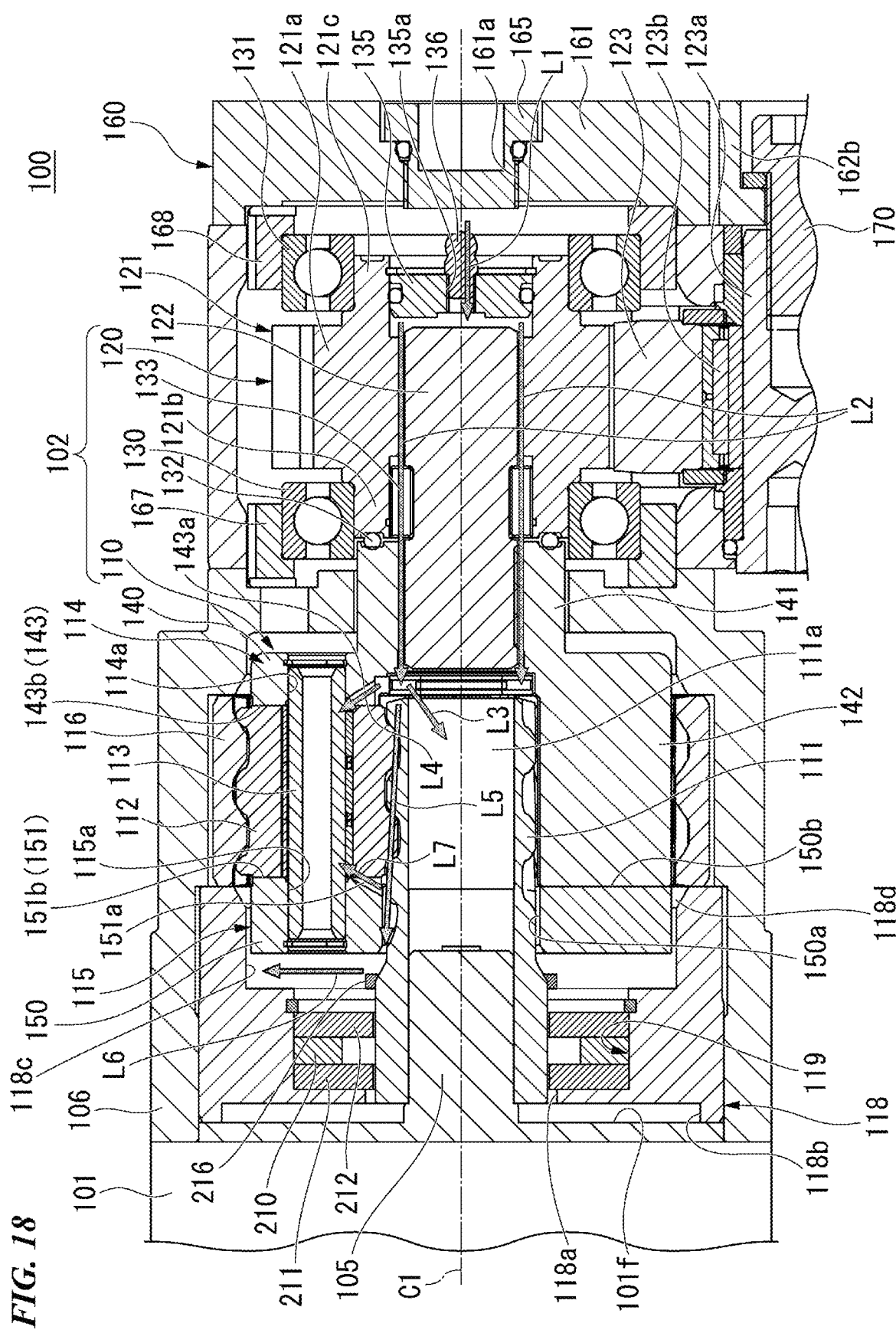
FIG. 18 is a view showing an exemplary example of a flow of a lubricant according to the embodiment.

As shown in FIG. 18, first, the first lid member 165 is removed from the cover unit 160 to open the first supply opening 161*a*. Then, the grease nipple 136 is exposed through the first supply opening 161*a*. Next, the grease nipple 136 is opened by applying pressure to the grease nipple 136 by connecting a grease gun or the like, and the lubricant is supplied to an inner peripheral side (gap) of the transfer gear 121 through the supply hole 135*a* (in a direction of an arrow L1 in the drawing). Then, the lubricant enters an inner peripheral side (gap) of the carriers 114 and 115 along an outer periphery (gap of the spline) of the transfer shaft 122 (in a direction of an arrow L2 in the drawing). Thereafter, the lubricant enters the hollow portion 111*a* of the sun gear 111 (in a direction of an arrow L3 in the drawing). As a result, the lubricant can be stored in the hollow portion 111*a*.

In a case in which the output shaft 105 rotates in response to the driving of the motor 101, the sun gear 111 rotates. Then, the lubricant in the hollow portion 111*a* of the sun gear 111 flows from the axial distal end portion of the sun gear 111 toward the outer side in the radial direction due to the centrifugal force. Then, a part of the lubricant that has come out from the axial distal end portion of the sun gear 111 flows in a direction of an arrow LA along the first guide groove 143*a* of the first carrier 114, and enters an inner peripheral side (gap) of the planetary gear 112 and a side surface side (gap) of the planetary gear 112. Thereafter, the lubricant enters an inner peripheral side (gap) of the ring gear 116. As a result, the sun gear 111, the planetary gear 112, and the ring gear 116 can be lubricated.

On the other hand, another part of the lubricant that has come out of the axial distal end portion of the sun gear 111 flows along the outer periphery of the sun gear 111 in a direction of an arrow L5, and flows toward the capturing portion 216. A part of the lubricant that flows toward the capturing portion 216 flows in a direction of an arrow L6 along the axial distal end surface of the capturing portion 216, and flows toward the inner peripheral surface of the outer recess portion 118c. Thereafter, the lubricant enters the inner peripheral side (gap) of the ring gear 116 along the inner peripheral surface of the outer recess portion 118c. As a result, the sun gear 111, the planetary gear 112, and the ring gear 116 can be lubricated.

A part of the lubricant that flows along the outer periphery of the sun gear 111 flows in a direction of an arrow L7 along the second guide groove 151a of the second carrier 115, and enters the inner peripheral side (gap) of the planetary gear 112 and the side surface side (gap) of the planetary gear 112. Thereafter, the lubricant enters an inner peripheral side (gap) of the ring gear 116. As a result, the sun gear 111, the planetary gear 112, and the ring gear 116 can be lubricated.

It should be noted that a part of the lubricant that flows along the outer periphery of the sun gear 111 may enter the inner recess portion 118b of the holder 118. As a result, the lubricant can be stored in the inner recess portion 118b of the holder 118.

As described above, for example, the grease nipple 136 is opened by the grease gun or the like, the lubricant is supplied through the supply hole 135a, and the motor 101 is driven, so that the lubricant intervenes between the hollow portion 111a of the sun gear 111, the meshing portion of the gears, the gap between the motor 101 and the holder 118, and the like. As a result, the heat generated by the motor 101 and the heat generated by the friction of each portion can be released to the outside through the portion with the intervening lubricant as a path. Therefore, cooling the motor 101 and the planetary gear mechanism 110 can be promoted.

<Actions and Effects>

As described above, the electric cylinder 100 according to the present embodiment includes the motor 101 that is a driving source, the output shaft 105 configured to rotate in response to the driving of the motor 101, the sun gear 111 coupled to the output shaft 105 and configured to rotate in response to the rotation of the output shaft 105, the tubular holder 118 disposed adjacent to the axial end surface 101f of the motor 101 and including the fluid accommodation portion 201 that allows the magnetic fluid 200 to be accommodated between the holder 118 and the outer periphery of the sun gear 111, the pair of magnetic pole pieces 211 and 212 provided on the inner peripheral surface of the holder 118, and the magnet 210 disposed between the pair of magnetic pole pieces 211 and 212 and configured to hold the magnetic fluid 200 in the fluid accommodation portion 201 by using the action of the magnetic field.

In this configuration, the magnetic fluid 200 can be held in the fluid accommodation portion 201 by using the action of the magnetic field. As a result, the gap between the outer peripheral surface of the sun gear 111 and the inner peripheral surface of the holder 118 is filled with the magnetic fluid 200. Therefore, a heat transfer path from the output shaft 105 to the holder 118 and a heat transfer path from the tooth surface of the sun gear 111 to the holder 118 can be maintained via the magnetic fluid 200. Therefore, in a case in which the heat generated by the motor 101 is transferred from the output shaft 105 to the sun gear 111, the heat can be released to the outside through the portion with the intervening magnetic fluid 200. In addition, the heat generated on the tooth surface of the sun gear 111 can be released to the outside through the portion with the intervening magnetic fluid 200. Therefore, the heat from the motor 101 and the heat from the tooth surface of the sun gear 111 can be efficiently released to the outside.

For example, in a case in which the lubricant, such as grease, intervenes in the above-described gap, the lubricant is scattered due to the rotation of the sun gear 111 or the like, so that it is difficult to maintain the heat transfer path from the output shaft 105 to the holder 118. On the other hand, in the present embodiment, even in a case in which the sun gear 111 rotates, the magnetic fluid 200 can be held in the fluid accommodation portion 201 by using the action of the magnetic field. In addition, even in a case in which the temperature is increased, the magnetic fluid 200 is held in the fluid accommodation portion 201 by using the action of the magnetic field, so that the heat transfer path can be maintained.

In the present embodiment, the output shaft 105 protrudes outward in the axial direction from the axial end surface 101f of the motor 101. The sun gear 111 is formed in a tubular shape coaxial with the output shaft 105. The magnetic pole pieces 211 and 212 are formed in an annular shape coaxial with the sun gear 111. The fluid accommodation portion 201 includes the gaps 201a and 201b that allow the magnetic fluid 200 to be accommodated between the outer peripheral surface of the sun gear 111 and the inner peripheral surfaces of the magnetic pole pieces 211 and 212.

In this configuration, the gaps 201a and 201b are formed in an annular shape along the outer peripheral surface of the sun gear 111 and the inner peripheral surfaces of the magnetic pole pieces 211 and 212. The magnetic fluid 200 is held in the annular gaps 201a and 201b formed in a ring shape by using the action of the magnetic field. Therefore, the heat transfer path from the output shaft 105 to the holder 118 and the heat transfer path from the tooth surface of the sun gear 111 to the holder 118 can be maintained via the magnetic fluid 200 held in the annular gaps 201a and 201b. Therefore, in a case in which the heat generated by the motor 101 is transferred from the output shaft 105 to the sun gear 111, the heat can be released to the outside through the portion with the intervening magnetic fluid 200 between the annular gaps 201a and 201b and the inner peripheral surfaces of the magnetic pole pieces 211 and 212. In addition, the heat generated on the tooth surface of the sun gear 111 can be released to the outside through the portion with the intervening magnetic fluid 200 between the annular gaps 201a and 201b and the inner peripheral surfaces of the magnetic pole pieces 211 and 212. Therefore, the heat from the motor 101 and the heat from the tooth surface of the sun gear 111 can be further efficiently released to the outside.

In the present embodiment, the magnet 210 is formed in an annular shape coaxial with the sun gear 111. The fluid accommodation portion 201 includes the space 201c that allows the magnetic fluid 200 to be accommodated between the outer peripheral surface of the sun gear 111 and the inner peripheral surface of the magnet 210.

In this configuration, the space 201c is formed in an annular shape along the outer peripheral surface of the sun gear 111 and the inner peripheral surface of the magnet 210. The magnetic fluid 200 is held in the space 201c formed in an annular shape by using the action of the magnetic field.

Therefore, the heat transfer path from the output shaft 105 to the holder 118 and the heat transfer path from the tooth surface of the sun gear 111 to the holder 118 can be maintained via the magnetic fluid 200 held in the annular space 201c. Therefore, in a case in which the heat generated by the motor 101 is transferred from the output shaft 105 to the sun gear 111, the heat can be released to the outside through the portion with the intervening magnetic fluid 200 in the annular space 201c and the inner peripheral surface of the magnet 210. In addition, the heat generated on the tooth surface of the sun gear 111 can be released to the outside through the portion with the intervening magnetic fluid 200 in the annular space 201c and the inner peripheral surface of the magnet 210. Therefore, the heat from the motor 101 and the heat from the tooth surface of the sun gear 111 can be further efficiently released to the outside.

In the present embodiment, the holder 118 is formed in an annular shape coaxial with the sun gear 111, and includes the support surface 119a extending in the radial direction of the sun gear 111. The pair of magnetic pole pieces 211 and 212 are the first magnetic pole piece 211 disposed between the support surface 119a and the magnet 210, and the second magnetic pole piece 212 disposed adjacent to the surface of the magnet 210 opposite to the first magnetic pole piece 211.

In this configuration, the first gap 201a is formed in an annular shape along the outer peripheral surface of the sun gear 111 and the inner peripheral surface of the first magnetic pole piece 211. The second gap 201b is formed in an annular shape along the outer peripheral surface of the sun gear 111 and the inner peripheral surface of the second magnetic pole piece 212. The magnetic fluid 200 is held in the first gap 201a and the second gap 201b, which are formed in an annular shape, by using the action of the magnetic field. Therefore, the heat transfer path from the output shaft 105 to the holder 118 and the heat transfer path from the tooth surface of the sun gear 111 to the holder 118 can be maintained via the magnetic fluid 200 held in the first gap 201a and the second gap 201b, which have an annular shape. Therefore, in a case in which the heat generated by the motor 101 is transferred from the output shaft 105 to the sun gear 111, the heat can be released to the outside through the portion with the intervening magnetic fluid 200 between the annular first gap 201a and the second gap 201b, the inner peripheral surfaces of the first magnetic pole piece 211 and the second magnetic pole piece 212. In addition, the heat generated on the tooth surface of the sun gear 111 can be released to the outside through the portion with the intervening magnetic fluid 200 between the first and second gaps 201a and 201b, which have an annular shape, and the inner peripheral surfaces of the first magnetic pole piece 211 and the second magnetic pole piece 212. Therefore, the heat from the motor 101 and the heat from the tooth surface of the sun gear 111 can be further efficiently released to the outside.

Figure 19:
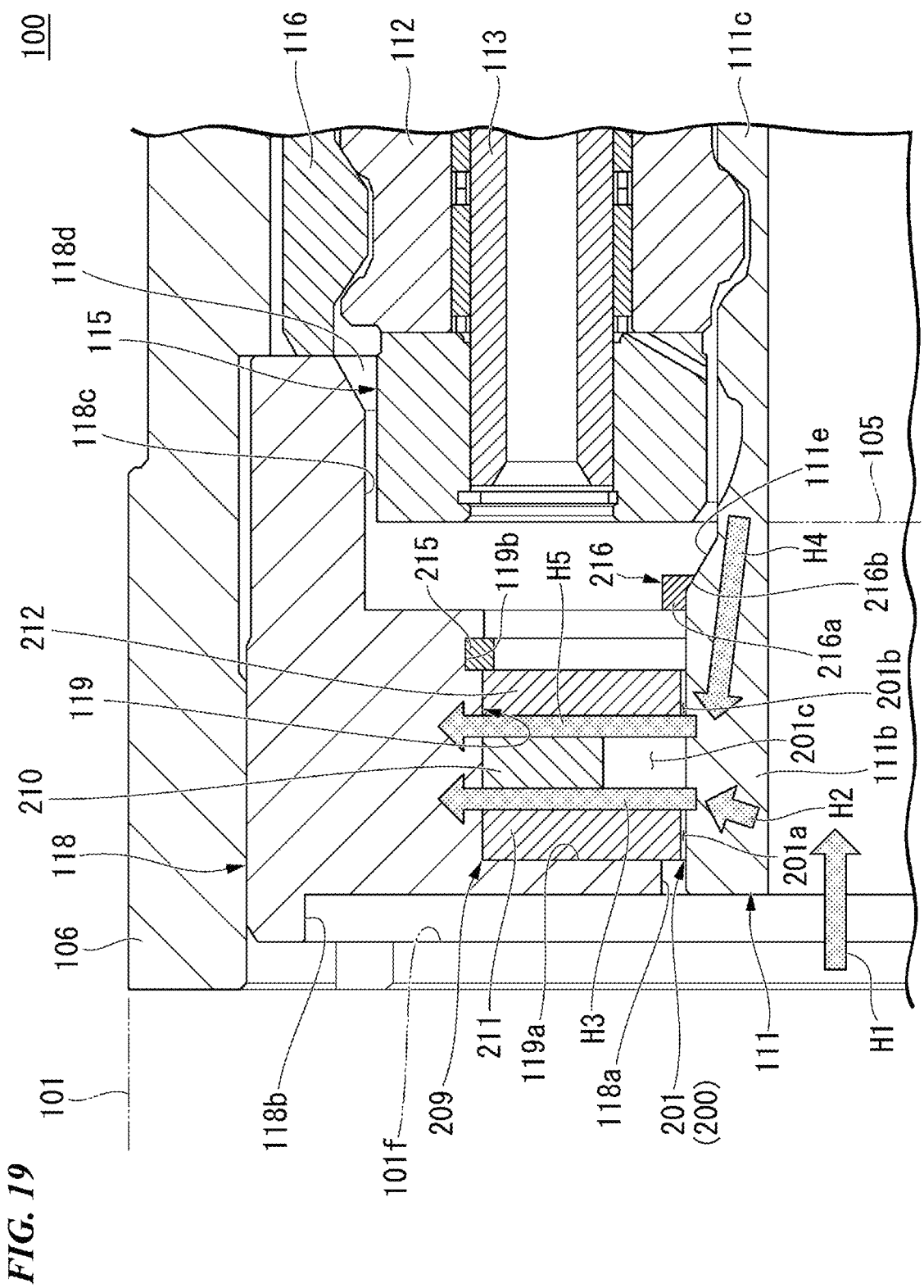
FIG. 19 is a view showing an exemplary example in which heat from a motor according to the embodiment and heat from a tooth surface of a sun gear are moved.

For example, as shown in FIG. 19, the heat from the motor 101 may move along the output shaft 105 in a direction of an arrow H1 and move along the coupling tubular portion 111b of the sun gear 111 in a direction of an arrow H2. In this case, the heat of the coupling tubular portion 111b of the sun gear 111 moves in a direction of an arrow H3 through the portion with the intervening magnetic fluid 200 in the annular first gap 201a and the inner peripheral surface of the first magnetic pole piece 211. The heat moved in the direction of the arrow H3 is toward the outside through the holder 118 and the case 106. Therefore, the heat from the motor 101 can be efficiently released to the outside. For example, as shown in FIG. 19, the heat generated on the tooth surface of the sun gear 111 may move along the coupling tubular portion 111b of the sun gear 111 in a direction of an arrow H4. In this case, the heat of the coupling tubular portion 111b of the sun gear 111 moves in a direction of an arrow H5 through the portion with the intervening magnetic fluid 200 in the annular second gap 201b and the inner peripheral surface of the second magnetic pole piece 212. The heat moved in the direction of the arrow H5 is toward the outside through the holder 118 and the case 106. Therefore, the heat of the tooth surface of the sun gear 111 can be efficiently released to the outside.

In the present embodiment, the electric cylinder 100 includes the retaining ring 215 disposed adjacent to the surface of the second magnetic pole piece 212 opposite to the magnet 210 and configured to stop the second magnetic pole piece 212 from coming off outward in the axial direction of the motor 101. The holder 118 includes the fitting groove 119b recessed to allow the retaining ring 215 to be fitted.

In this configuration, the retaining ring 215 is fitted into the fitting groove 119b of the holder 118, whereby the second magnetic pole piece 212 can be stopped from coming out outward in the axial direction of the motor 101. In addition, the number of components can be reduced and the cost can be reduced as compared with a case in which the fitting groove 119b is provided in a member other than the holder 118.

In the present embodiment, the holder 118 includes the outer recess portion 118c that is open outward in the axial direction of the motor 101. The inner peripheral surface of the outer recess portion 118c is disposed on the axial outer side of the motor 101 with respect to the fluid accommodation portion 201 and is disposed on the radial outer side of the sun gear 111 with respect to the fluid accommodation portion 201. The electric cylinder 100 includes the capturing portion 216 that protrudes from the outer peripheral surface of the sun gear 111 toward the inner peripheral surface of the outer recess portion 118c. The capturing portion 216 can capture the lubricant attempting to flow from the axial distal end portion side of the sun gear 111 toward the fluid accommodation portion 201.

In this configuration, the lubricant attempting to flow from the axial distal end portion side of the sun gear 111 toward the fluid accommodation portion 201 can be captured by the capturing portion 216, so that the entry of the lubricant into the fluid accommodation portion 201 can be suppressed. Therefore, it is possible to suppress the lubricant from being mixed with the magnetic fluid 200 held in the fluid accommodation portion 201. In addition, in a case in which the sun gear 111 rotates, the lubricant flowing toward the capturing portion 201 flows toward the inner peripheral surface of the outer recess portion 118c due to the centrifugal force. Therefore, the lubricant can be supplied to the inner peripheral surface of the outer recess portion 118c. For example, as shown in FIG. 18, another part of the lubricant that has come out from the axial distal end portion of the sun gear 111 flows along the outer periphery of the sun gear 111 in the direction of the arrow L5 and flows toward the capturing portion 216. A part of the lubricant that flows toward the capturing portion 216 flows in the direction of the arrow L6 along the axial distal end surface of the capturing portion 216 due to the centrifugal force, and flows toward the inner peripheral surface of the outer recess portion 118c. Thereafter, the lubricant enters the inner peripheral side (gap) of the ring gear 116 along the inner peripheral surface of the outer recess portion 118c. As a result, the sun gear 111, the planetary gear 112, and the ring gear 116 can be lubricated.

In the present embodiment, the excavator 1 includes the vehicle body 2, and the work equipment 3 coupled to the vehicle body 2. The work equipment 3 includes the electric cylinder 100.

Therefore, it is possible to provide the excavator 1 that can efficiently release the heat from the motor 101 and the heat from the tooth surface of the sun gear to the outside.

In the present embodiment, the work equipment 3 includes the common electric cylinder 100 as the first electric cylinder 100A, the second electric cylinder 100B, and the third electric cylinder 100C.

Therefore, the number of components can be reduced and the cost can be reduced as compared with a case in which electric cylinders different from each other are provided as the first electric cylinder 100A, the second electric cylinder 100B, and the third electric cylinder 100C.

OTHER EMBODIMENTS

In the above-described embodiment, the exemplary example has been described in which the electric cylinder includes the planetary gear mechanism that transmits the driving force of the motor to the piston, but the present invention is not limited to this. For example, the electric cylinder need not include the planetary gear mechanism. For example, the electric cylinder may include a power transmission mechanism other than the planetary gear mechanism, such as a belt pulley mechanism or a rack and pinion mechanism. For example, the aspect of the power transmission mechanism can be changed depending on the required specifications.

In the above-described embodiment, the exemplary example has been described in which the electric cylinder includes the sun gear that rotates in response to the rotation of the output shaft, the planetary gear that rotates in response to the rotation of the sun gear, and the tubular holder including the fluid accommodation portion that can accommodate the magnetic fluid between the holder and the outer periphery of the sun gear, but the present invention is not limited to this. For example, the electric cylinder may include a pulley that rotates in response to the rotation of the output shaft, a belt that rotates in response to the rotation of the pulley, and a tubular holder having a fluid accommodation portion capable of accommodating the magnetic fluid between the holder and an outer periphery of the pulley. For example, the electric cylinder may include a pinion that rotates in response to the rotation of the output shaft, a belt that moves in response to the rotation of the pinion, a gear that rotates in response to the movement of the belt, and a tubular holder having a fluid accommodation portion capable of accommodating the magnetic fluid between the holder and an outer periphery of the pinion. For example, the electric cylinder need only include a motor that is a driving source, an output shaft configured to rotate in response to driving of the motor, a rotating body coupled to the output shaft and configured to rotate in response to the rotation of the output shaft, a tubular holder disposed adjacent to an axial end surface of the motor and including a fluid accommodation portion that allows a magnetic fluid to be accommodated between the holder and an outer periphery of the rotating body, a pair of magnetic pole pieces provided on an inner peripheral surface of the holder, and a magnet disposed between the pair of magnetic pole pieces and configured to hold the magnetic fluid in the fluid accommodation portion by using an action of a magnetic field. For example, the aspect of the rotating body that rotates in response to the rotation of the output shaft can be changed depending on the required specifications.

In the above-described embodiment, the exemplary example has been described in which the magnetic pole piece is formed in an annular shape coaxial with the sun gear, but the present invention is not limited to this. For example, the magnetic pole piece need not be formed in an annular shape coaxial with the sun gear. For example, the magnetic pole piece may be formed by disposing a plurality of small magnetic pole pieces to be arranged in an annular shape. For example, the aspect of the magnetic pole piece can be changed depending on the required specifications.

In the above-described embodiment, the exemplary example has been described in which the magnet is formed in an annular shape coaxial with the sun gear, but the present invention is not limited to this. For example, the magnet need not be formed in an annular shape coaxial with the sun gear. For example, the magnet may be formed by disposing a plurality of small magnets to be arranged in an annular shape. For example, the aspect of the magnet can be changed depending on the required specifications.

In the above-described embodiment, the exemplary example has been described in which the fluid accommodation portion includes the space that allows the magnetic fluid to be accommodated between the outer peripheral surface of the sun gear and the inner peripheral surface of the magnet, but the present invention is not limited to this. For example, the fluid accommodation portion need not include the space that allows the magnetic fluid to be accommodated between the outer peripheral surface of the sun gear and the inner peripheral surface of the magnet. For example, the fluid accommodation portion need only include a gap that allows the magnetic fluid to be accommodated between the outer peripheral surface of the sun gear and the inner peripheral surface of the magnetic pole piece. For example, the aspect of the fluid accommodation portion can be changed depending on the required specifications.

In the above-described embodiment, the exemplary example has been described in which the inner peripheral surface of the magnet is disposed on a radial outer side of the sun gear with respect to the inner peripheral surface of the magnetic pole piece, but the present invention is not limited to this. For example, the inner peripheral surface of the magnet need not be disposed on the radial outer side of the sun gear with respect to the inner peripheral surface of the magnetic pole piece. For example, the inner peripheral surface of the magnet may be disposed on the radial inner side of the sun gear with respect to the inner peripheral surface of the magnetic pole piece. For example, the inner peripheral surface of the magnet may be disposed at the same position as the inner peripheral surface of the magnetic pole piece in the radial direction of the sun gear. For example, the disposition aspect of the inner peripheral surface of the magnet can be changed depending on the required specifications.

In the above-described embodiment, the exemplary example has been described in which the holder is formed in an annular shape coaxial with the sun gear and includes the support surface extending in the radial direction of the sun gear, but the present invention is not limited to this. For example, the holder need not include the support surface. For example, the support surface may be provided on a member other than the holder. For example, the aspect of the holder can be changed depending on the required specifications.

In the above-described embodiment, the exemplary example has been described in which the pair of magnetic pole pieces are the first magnetic pole piece disposed between the support surface and the magnet, and the second magnetic pole piece disposed adjacent to the surface of the magnet opposite to the first magnetic pole piece, the magnet, the first magnetic pole piece, and the second magnetic pole piece constitute the fluid holding structure for holding the magnetic fluid in the fluid accommodation portion, and only one fluid holding structure is provided on the inner peripheral surface of the accommodation recess portion, but the present invention is not limited to this. For example, a plurality of the fluid holding structures may be provided on the inner peripheral surface of the accommodation recess portion of the holder. For example, two or more magnets and three or more magnetic pole pieces may be alternately disposed adjacent to each other. For example, the installation aspects of the magnet, the first magnetic pole piece, and the second magnetic pole piece (installation aspect of the fluid holding structure) can be changed depending on the required specifications.

In the above-described embodiment, the exemplary example has been described in which the electric cylinder includes the retaining ring disposed adjacent to the surface of the second magnetic pole piece opposite to the magnet and stops the second magnetic pole piece from coming off outward in an axial direction of the motor, but the present invention is not limited to this. For example, the electric cylinder need not include the retaining ring. For example, the installation aspect of the retaining ring can be changed depending on the required specifications. For example, the outer peripheral portion of the magnetic pole piece may be fixed by the screwing onto the inner peripheral surface of the accommodation recess portion of the holder. For example, the magnetic pole piece may be fixed via a plate and a bolt. For example, the holding aspect of the magnetic pole piece and the magnet can be changed depending on the required specifications.

In the above-described embodiment, the exemplary example has been described in which the holder includes the fitting groove that is recessed to allow the retaining ring to be fitted, but the present invention is not limited to this. For example, the holder need not include the fitting groove. For example, the fitting groove may be provided in a member other than the holder. For example, the installation aspect of the fitting groove can be changed depending on the required specifications.

In the above-described embodiment, the exemplary example has been described in which the electric cylinder includes the capturing portion that protrudes from the outer peripheral surface of the sun gear toward the inner peripheral surface of the outer recess portion of the holder and can capture the lubricant attempting to flow from the axial distal end portion side of the sun gear toward the fluid accommodation portion, but the present invention is not limited to this. For example, the electric cylinder need not include the capturing portion. For example, the installation aspect of the capturing portion can be changed depending on the required specifications.

In the above-described embodiment, the exemplary example has been described in which the work equipment includes the common electric cylinder as the first electric cylinder, the second electric cylinder, and the third electric cylinder, but the present invention is not limited to this. For example, the work equipment may include electric cylinders different from each other as the first electric cylinder, the second electric cylinder, and the third electric cylinder. For example, the installation aspect of the electric cylinder can be changed depending on the required specifications.

In the above-described embodiment, the excavator has been described as an exemplary example of the work machine (work vehicle), but the present invention is not limited to this. For example, the present invention may be applied to other work vehicles, such as a dump truck, a bulldozer, and a wheel loader.

Although the embodiments of the present invention have been described above, the present invention is not limited to this, additions, omissions, substitutions, and other modifications of the configuration can be made without departing from the spirit of the present invention, and the above-described embodiments can be appropriately combined.

REFERENCE SIGNS LIST

1: Excavator (work machine)
2: Vehicle body
3: Work equipment
100: Electric cylinder
100A: First electric cylinder (electric cylinder)
100B: Second electric cylinder (electric cylinder)
100C: Third electric cylinder (electric cylinder)
101: Motor
101$f$: Axial end surface of motor
101A: First motor (motor)
101B: Second motor (motor)
101C: Third motor (motor)
105: Output shaft
111: Sun gear
118: Holder
118$c$: Outer recess portion
119$a$: Support surface
119$b$: Fitting groove
200: Magnetic fluid
201: Fluid accommodation portion
201$a$: First gap (gap)
201$b$: Second gap (gap)
201$c$: Space
210: Magnet
211: First magnetic pole piece (magnetic pole piece)
212: Second magnetic pole piece (magnetic pole piece)
215: Retaining ring
216: Capturing portion

The invention claimed is:

1. An electric cylinder comprising:
a motor that is a driving source;
an output shaft configured to rotate in response to driving of the motor;
a sun gear coupled to the output shaft and configured to rotate in response to rotation of the output shaft;
a tubular holder disposed adjacent to an axial end surface of the motor and including a fluid accommodation portion that allows a magnetic fluid to be accommodated between the holder and an outer periphery of the sun gear;
a pair of magnetic pole pieces provided on an inner peripheral surface of the holder; and
a magnet disposed between the pair of magnetic pole pieces and configured to hold the magnetic fluid in the fluid accommodation portion by using an action of a magnetic field.

2. The electric cylinder according to claim 1, wherein the output shaft protrudes outward in an axial direction from the axial end surface of the motor, the sun gear is formed in a tubular shape coaxial with the output shaft, the magnetic pole piece is formed in an annular shape coaxial with the sun gear, and the fluid accommodation portion includes a gap that allows the magnetic fluid to be accommodated between an outer peripheral surface of the sun gear and an inner peripheral surface of the magnetic pole piece.

3. The electric cylinder according to claim 2, wherein the holder includes an outer recess portion that is open outward in an axial direction of the motor, an inner peripheral surface of the outer recess portion is disposed on an axial outer side of the motor with respect to the fluid accommodation portion and is disposed on a radial outer side of the sun gear with respect to the fluid accommodation portion, and the electric cylinder further comprises a capturing portion protruding from an outer peripheral surface of the sun gear toward the inner peripheral surface of the outer recess portion and configured to capture a lubricant attempting to flow from an axial distal end portion side of the sun gear toward the fluid accommodation portion.

4. A work machine comprising:
a vehicle body; and
work equipment coupled to the vehicle body, wherein the work equipment includes the electric cylinder according to claim 2.

5. The electric cylinder according to claim 2, wherein the magnet is formed in an annular shape coaxial with the sun gear, and the fluid accommodation portion further includes a space that allows the magnetic fluid to be accommodated between the outer peripheral surface of the sun gear and an inner peripheral surface of the magnet.

6. The electric cylinder according to claim 5, wherein the holder is formed in an annular shape coaxial with the sun gear and includes a support surface extending in a radial direction of the sun gear, and the pair of magnetic pole pieces include
a first magnetic pole piece disposed between the support surface and the magnet, and
a second magnetic pole piece disposed adjacent to a surface of the magnet opposite to the first magnetic pole piece.

7. The electric cylinder according to claim 5, wherein the holder includes an outer recess portion that is open outward in an axial direction of the motor, an inner peripheral surface of the outer recess portion is disposed on an axial outer side of the motor with respect to the fluid accommodation portion and is disposed on a radial outer side of the sun gear with respect to the fluid accommodation portion, and the electric cylinder further comprises a capturing portion protruding from an outer peripheral surface of the sun gear toward the inner peripheral surface of the outer recess portion and configured to capture a lubricant attempting to flow from an axial distal end portion side of the sun gear toward the fluid accommodation portion.

8. A work machine comprising:
a vehicle body; and
work equipment coupled to the vehicle body, wherein the work equipment includes the electric cylinder according to claim 5.

9. The electric cylinder according to claim 5, wherein the inner peripheral surface of the magnet is disposed on a radial outer side of the sun gear with respect to the inner peripheral surface of the magnetic pole piece.

10. The electric cylinder according to claim 9, wherein the holder is formed in an annular shape coaxial with the sun gear and includes a support surface extending in a radial direction of the sun gear, and the pair of magnetic pole pieces include
a first magnetic pole piece disposed between the support surface and the magnet, and
a second magnetic pole piece disposed adjacent to a surface of the magnet opposite to the first magnetic pole piece.

11. The electric cylinder according to claim 9, wherein the holder includes an outer recess portion that is open outward in an axial direction of the motor, an inner peripheral surface of the outer recess portion is disposed on an axial outer side of the motor with respect to the fluid accommodation portion and is disposed on a radial outer side of the sun gear with respect to the fluid accommodation portion, and the electric cylinder further comprises a capturing portion protruding from an outer peripheral surface of the sun gear toward the inner peripheral surface of the outer recess portion and configured to capture a lubricant attempting to flow from an axial distal end portion side of the sun gear toward the fluid accommodation portion.

12. A work machine comprising:
a vehicle body; and
work equipment coupled to the vehicle body, wherein the work equipment includes the electric cylinder according to claim 9.

13. The electric cylinder according to claim 2, wherein the holder is formed in an annular shape coaxial with the sun gear and includes a support surface extending in a radial direction of the sun gear, and the pair of magnetic pole pieces include
a first magnetic pole piece disposed between the support surface and the magnet, and
a second magnetic pole piece disposed adjacent to a surface of the magnet opposite to the first magnetic pole piece.

14. The electric cylinder according to claim 13, further comprising:
a retaining ring disposed adjacent to a surface of the second magnetic pole piece opposite to the magnet and configured to stop the second magnetic pole piece from coming off outward in an axial direction of the motor, wherein the holder includes a fitting groove recessed to allow the retaining ring to be fitted therein.

15. The electric cylinder according to claim 14, wherein the holder includes an outer recess portion that is open outward in an axial direction of the motor, an inner peripheral surface of the outer recess portion is disposed on an axial outer side of the motor with respect to the fluid accommodation portion and is disposed on a radial outer side of the sun gear with respect to the fluid accommodation portion, and the electric cylinder further comprises a capturing portion protruding from an outer peripheral surface of the sun gear toward the inner peripheral surface of the outer recess portion and configured to capture a lubricant attempting to flow from an axial distal end portion side of the sun gear toward the fluid accommodation portion.

16. A work machine comprising:
a vehicle body; and
work equipment coupled to the vehicle body, wherein
the work equipment includes the electric cylinder according to claim 14.

17. The electric cylinder according to claim 13, wherein
the holder includes an outer recess portion that is open outward in an axial direction of the motor,
an inner peripheral surface of the outer recess portion is disposed on an axial outer side of the motor with respect to the fluid accommodation portion and is disposed on a radial outer side of the sun gear with respect to the fluid accommodation portion, and
the electric cylinder further comprises a capturing portion protruding from an outer peripheral surface of the sun gear toward the inner peripheral surface of the outer recess portion and configured to capture a lubricant attempting to flow from an axial distal end portion side of the sun gear toward the fluid accommodation portion.

18. A work machine comprising:
a vehicle body; and
work equipment coupled to the vehicle body, wherein
the work equipment includes the electric cylinder according to claim 13.

19. The electric cylinder according to claim 1, wherein
the holder includes an outer recess portion that is open outward in an axial direction of the motor,
an inner peripheral surface of the outer recess portion is disposed on an axial outer side of the motor with respect to the fluid accommodation portion and is disposed on a radial outer side of the sun gear with respect to the fluid accommodation portion, and
the electric cylinder further comprises a capturing portion protruding from an outer peripheral surface of the sun gear toward the inner peripheral surface of the outer recess portion and configured to capture a lubricant attempting to flow from an axial distal end portion side of the sun gear toward the fluid accommodation portion.

20. A work machine comprising:
a vehicle body; and
work equipment coupled to the vehicle body, wherein
the work equipment includes the electric cylinder according to claim 1.

\* \* \* \* \*